(12) United States Patent
Voynov

(10) Patent No.: US 11,754,690 B2
(45) Date of Patent: Sep. 12, 2023

(54) METHODS AND SYSTEMS FOR CALIBRATING MULTIPLE LIDAR SENSORS

(71) Applicant: YANDEX SELF DRIVING GROUP LLC, Moscow (RU)

(72) Inventor: Andrey Sergeevich Voynov, Moscow (RU)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 416 days.

(21) Appl. No.: 17/010,982

(22) Filed: Sep. 3, 2020

(65) Prior Publication Data

US 2021/0199783 A1 Jul. 1, 2021

(51) Int. Cl.
| | |
|---|---|
| *G01S 7/497* | (2006.01) |
| *G01S 17/931* | (2020.01) |
| *G01S 17/894* | (2020.01) |
| *G01S 17/10* | (2020.01) |
| *G06N 7/00* | (2023.01) |

(52) U.S. Cl.
CPC ............ *G01S 7/497* (2013.01); *G01S 17/10* (2013.01); *G01S 17/894* (2020.01); *G01S 17/931* (2020.01); *G06N 7/005* (2013.01)

(58) Field of Classification Search
CPC ........ G01S 7/497; G01S 17/931; G01S 17/10; G01S 7/931
See application file for complete search history.

(56) References Cited

U.S. PATENT DOCUMENTS

| | | | |
|---|---|---|---|
| 10,860,871 B2* | 12/2020 | Zhu | G01S 19/14 |
| 2017/0280125 A1 | 9/2017 | Brown et al. | |
| 2018/0188026 A1* | 7/2018 | Zhang | G06V 20/588 |
| 2018/0188043 A1 | 7/2018 | Chen et al. | |
| 2018/0307925 A1 | 10/2018 | Wisniowski et al. | |
| 2018/0313942 A1 | 11/2018 | Ma et al. | |
| 2019/0188872 A1 | 6/2019 | Aflalo et al. | |

FOREIGN PATENT DOCUMENTS

FR 2942064 A1 8/2010

OTHER PUBLICATIONS

Pereira "Self calibration of multiple LIDARs and cameras on autonomous vehicles", May 2016, Robotics and Autonomous Systems 83, DOI: 10.1016/j.robot.2016.05.010.

(Continued)

*Primary Examiner* — Bryan Bui
(74) *Attorney, Agent, or Firm* — BCF LLP

(57) ABSTRACT

A method and an electronic device for merging digital datasets in a single multidimensional space are provided. The method comprises: selecting, by the electronic device, (i) at least some of the plurality of first data points and (ii) at least some of the plurality of second data points; matching, by the electronic device, the first data points with the second data points, thereby determining a plurality of pairs; determining, by the electronic device, a pair-specific error value for a given one of the plurality of pairs; determining, by the electronic device, a weight factor for the given one of the plurality of pairs based on a normal vector associated with the given second data point in the given one of the plurality of pairs; and determining, by the electronic device, a global error value for the second dataset.

20 Claims, 12 Drawing Sheets

(56) References Cited

OTHER PUBLICATIONS

Rusinkiewicz, "Efficient Variants of the ICP Algorithm", Published 2001, Computer Science Proceedings Third International Conference on 3-D Digital Imaging and Modeling, DOI:10.1109/IM.2001.924423Corpus ID: 11663609.

Liu, "On-Road Vehicle Recognition Using the Symmetry Property and Snake Models", International Journal of Advanced Robotic Systems, Accepted: Nov. 6, 2013, DOI: 10.5772/57382.

Yuan et al., 3D point cloud matching based on principal component analysis and iterative closest point algorithm, 2016 International Conference on Audio Language and Image Processing, IEEE, Jul. 11, 2016, p. 404-408.

European Search Report issued in corresponding European patent application No. 2020661.8 dated Dec. 23, 2020.

* cited by examiner

METHODS AND SYSTEMS FOR CALIBRATING MULTIPLE LIDAR SENSORS

CROSS-REFERENCE

The present application claims priority to Russian Patent Application No. 2019145089, entitled "Methods and Systems for Calibrating Multiple Lidar Sensors", filed Dec. 30, 2019, the entirety of which is incorporated herein by reference.

FIELD OF TECHNOLOGY

The present technology relates to computer-implemented methods and systems for calibrating multiple LIDAR sensors installed onto a self driving car (SDC) using an Iterative Closest Point (ICP) algorithm.

BACKGROUND

Several computer based navigation systems that are configured for aiding navigation and/or control of vehicle have been proposed and implemented in the prior art. These systems range from more basic map-aided localization based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control system, which systems upon detection of the vehicle (or other obstacle) in front of the moving vehicle, slow down or stop the vehicle.

Some of the more advanced system provide for a fully autonomous driving of the vehicle without direct control from the operator (i.e. the driver). These autonomously vehicles include computer systems that can cause the vehicle to accelerate, brake, stop, change lane and self-park.

One of the main technical challenges in implementing the above computer systems is the ability for the computer system to detect an object present around the SDC—such as a vehicle in front of the SDC (the SDC having the computer system onboard), which vehicle in front may pose a risk/ danger to the SDC and may require the computer system to take a corrective measure, be it braking or otherwise changing speed, stopping or changing lanes. On a more granular level, the challenge of the object detection is not just the binary detection (presence or absence of the object), but the speed and accuracy associated with such an analysis and determination (especially avoiding "false negatives", whereby the system does not identify an object which is indeed present in front or around the vehicle).

A typical autonomous vehicle or a self-driving car (SDC), for short, comprises a plurality of sensors to enable the SDC to capture and "understand" its surround area. Typically, more than one type of sensors is used. For example, a given implementation of the SDC can include one or more cameras, one or more LIDARs, and one or more radars.

Thus, the SDC may receive data, in a form of 3D point clouds, of a given scene of its surrounding area from multiple LIDARs, where each 3D point cloud generated, by a respective one of the LIDARs, independently represents a respective portion of the given scene. Each 3D point cloud typically comprises scattered LIDAR points. Further, the SDC may combine the 3D point clouds generated by the multiple LIDARs in order to generate a comprehensive representation of the given scene, for example, for purposes of detecting objects or generating a 3D map. However, the 3D point clouds corresponding to the respective portions of the given scene may not be suitable for further generating the comprehensive representation of the given scene. For example, these 3D point clouds may not be aligned with each other geometrically, i.e. they can be represented as tilted relative to each other, for example. Furthermore, at least two 3D point clouds may include LIDAR points representative of one and the same objects (or parts thereof); therefore, such 3D point clouds should be accurately merged to avoid causing unnecessary or redundant information in the comprehensive representation of the given scene, which may ultimately affect overall accuracy of detecting objects in the surrounding area of the SDC.

For merging the 3D data representative of overlapping objects in different portions of the given scene, an Iterative Closest Point (ICP) algorithm may be used. The ICP algorithm typically comprises executing the following steps: (1) identifying a first 3D point cloud (also referred to herein as a reference, or a target 3D point cloud) and a second 3D point cloud (also referred to herein as a source point cloud); (2) for each LIDAR point in the first 3D point cloud, selecting a corresponding LIDAR point in the second 3D point cloud; (3) minimizing a distance between the LIDAR points by applying a transformation (translation or rotation, for example); (4) iteratively repeating steps (2) and (3) until a predetermined condition is reached. The predetermined condition may be, for example, a predetermined threshold value of an error metric. By so doing, the ICP algorithm is configured to merge the first 3D point cloud with the second 3D point cloud.

There are several prior art approaches to executing the ICP algorithm. For example, selecting corresponding LIDAR points may be performed based on a distance between LIDAR points in the first 3D point cloud and the respective LIDAR points in the second 3D point cloud. To that end, the ICP algorithm may be configured to iteratively select closest corresponding LIDAR points and minimize the distance therebetween up to a predetermined threshold value of an error metric. In this example, the error metric may be a sum of squared distances between corresponding points in the 3D point clouds, a so-called point-to-point metric (accordingly, the ICP algorithm is referred to as a point-to-point variant of the ICP algorithm).

In another example, prior to the step of selecting points, at each point in the first 3D point cloud, a normal can be pre-determined, and as such, the points can be selected based on a minimal distance between a given point in the second 3D point cloud and a given plane defined by a normal, having been pre-determined at a corresponding point in the first 3D point cloud. As in the previous example, the ICP algorithm further proceeds by minimizing, at each iteration, distance between so-selected points up to a predetermined value of an error metric. In this example, the error metric is a sum of squared distances between each of point in the second 3D point cloud and respective planes defined by normals predetermined at each point in the first 3D point cloud, a so-called point-to-plane error metric (accordingly, the ICP algorithm is referred to as a point-to-plane variant of the ICP algorithm). Thus, by minimizing the error metric, the second 3D point cloud merges (in other words, becomes aligned) with the first 3D point cloud.

However, it has been observed that, in certain applications, the prior art methods of selecting corresponding points may not yield a desirable accuracy level of convergence of the ICP algorithm. In other words, their ability to minimize the error metric may be limited, which can result in objects, in the comprehensive representation of the given scene, being distorted, for example.

US Patent Application Publication No.: 2018/0188043-A1 (published Jul. 5, 2018 and assigned to DeepMap Inc.) entitled "Classification of surfaces as hard/soft for combining data captured by autonomous vehicles for generating high definition maps" discloses a high-definition map system receiving sensor data from vehicles travelling along routes and combines the data to generate a high definition map for use in driving vehicles, for example, for guiding autonomous vehicles. A pose graph is built from the collected data, each pose representing location and orientation of a vehicle. The pose graph is optimized to minimize constraints between poses. Points associated with surface are assigned a confidence measure determined using a measure of hardness/softness of the surface. A machine-learning-based result filter detects bad alignment results and prevents them from being entered in the subsequent global pose optimization. The alignment framework is parallelizable for execution using a parallel/distributed architecture. Alignment hot spots are detected for further verification and improvement. The system supports incremental updates, thereby allowing refinements of sub-graphs for incrementally improving the high-definition map for keeping it up to date

SUMMARY

It is an object of the present technology to ameliorate at least some of the inconveniences present in the prior art.

The developers of the present technology have realized that LIDAR sensors operate in such a way that LIDAR points scattered from vertical surfaces generally have a far higher density than those scattered from horizontal surfaces, as an example. As such, a number of LIDAR points representing the vertical surfaces is significantly higher than a number of LIDAR points representing the horizontal surfaces. As a result, alignment of the two 3D point clouds may be better on the vertical surfaces and worse on the horizontal ones, or LIDAR points representative of the vertical surfaces in the second 3D point cloud may be merged with LIDAR points representative of the horizontal surfaces in the first 3D point cloud. This may affect the overall quality of merging and result in objects represented by the LIDAR sensors not corresponding to their real dimensions and locations.

Thus, the developers of the present technology have devised methods and systems for executing the ICP algorithm that are directed to, before applying the transformation to the corresponding pairs of LIDAR points, assigning weights thereto based on the density of their distribution. For example, LIDAR points having a higher density of distribution (representative of vertical surfaces) would be assigned smaller weights, while LIDAR points having lower density of distribution (representative of horizontal surfaces) would be assigned larger weights. Further, based on the assigned weights, corresponding pairs of the LIDAR points in the two 3D point clouds are iteratively selected minimizing the error metric therebetween. By so doing, the developers attempted to level out significance of sampling LIDAR points from vertical surfaces with sampling LIDAR points from horizontal surfaces, which is believed to improve the convergence of the ICP algorithm compared to the prior art methods.

In accordance with one broad aspect of the present technology, there is provided a method for merging digital datasets in a multidimensional space. The digital datasets comprise: (i) a first dataset having a plurality of first data points, and (ii) a second dataset having a plurality of second data points and a plurality of normal vectors, a given second data point from the plurality of second data points being associated with a respective normal vector from the plurality of normal vectors. The method is executable by an electronic device. The method comprises: matching, by the electronic device, at least some of the plurality of first data points with at least some of the plurality of second data points, thereby determining a plurality of pairs, a given one of the plurality of pairs including (i) a given first data point and (ii) a given second data point; determining, by the electronic device, a pair-specific error value for the given one of the plurality of pairs, the pair-specific error value being indicative of a distance measurement for the given one of the plurality of pairs in the multidimensional space; determining, by the electronic device, a weight factor for the given one of the plurality of pairs based on a normal vector associated with the given second data point in the given one of the plurality of pairs, such that the weight factor is inversely proportional to a density of occurrence of the normal vector in a distribution of the plurality of normal vectors; determining, by the electronic device, a global error value for the second dataset as a sum of the pair-specific error values having been weighted by the respective weight factors, the global error value being a measurement of a pre-determined error metric that is to be minimized for performing the merging of the digital datasets in the multidimensional space.

In some implementations of the method, the method further comprises, until a pre-determined stopping condition is reached: iteratively minimizing, by the electronic device, the global error value of the second dataset by adjusting an initial position of the second dataset relative to the first dataset in the multidimensional space, thereby iteratively determining intermediary positions of the second dataset relative to the first dataset in the multidimensional space, a latest intermediary positon of the second dataset being a final position of the second dataset relative to the first dataset in the multidimensional space.

In some implementations of the method, the second dataset in the final position is substantially merged with the first dataset.

In some implementations of the method, the method comprises: determining, by the electronic device a transformation rule for the second dataset to be displaced from the initial position to the final position.

In some implementations of the method, the transformation rule includes a translation rule and a rotation rule.

In some implementations of the method, the method further comprises, prior to the matching: selecting, by the electronic device, (i) the at least some of the plurality of first data points from the plurality of first data points and (ii) the at least some of the plurality of second data points from the plurality of second data points.

In some implementations of the method, the selecting comprises at least one of: applying, by the electronic device, a uniform sampling algorithm onto at least one of the plurality of first data points and the plurality of second data points; applying, by the electronic device, a random sampling algorithm onto at least one of the plurality of first data points and the plurality of second data points; and applying, by the electronic device, a normal-vector-distribution algorithm onto at least one of the plurality of first data points and the plurality of second data points.

In some implementations of the method, the matching comprises: determining, by the electronic device, for a given one of the at least some of the plurality of second data points a closest first data point from the at least some of the first plurality of data points to the given one of the at least some of the plurality of second data points in the multidimensional space, the given one of the at least some of the plurality of second data points and the closest first data point forming one of the plurality of pairs.

In some implementations of the method, the error metric is a sum of squared distances between data points in respective ones of the plurality of pairs, the error metric being a point-to-point-type error metric.

In some implementations of the method, the error metric is a sum of squared distances between a given second data point in a respective one of the plurality of pairs to a plane containing a given first data point in the respective one of the plurality of pairs, the plane being perpendicular to a normal vector associated with the given first data point in the respective one of the plurality of pairs, the error metric being a point-to-plane-type error metric.

In some implementations of the method, the determining the weight factor comprises: representing each of the plurality of normal vectors on a sphere of a predetermined dimension; calculating, for a given one of the plurality of normal vectors, a number of normal vectors located in a predetermined closed neighbourhood on the sphere; the given normal vector being associated with the given second data point in the given one of the plurality of pairs; determining, for the given one of the plurality of pairs, the weight factor as an inverse value of the number of normal vectors located in the predetermined closed neighbourhood.

In some implementations of the method, the sphere is approximated with a polyhedron, each vertex of which being located on the sphere, and the plurality of normal vectors being distributed amongst faces of the polyhedron based on proximity to a respective vertex thereof, and the determining the weight factor comprises: calculating a number of normal vectors located on a given face of the polyhedron, the given face containing the given normal vector associated with the given second data point in the given one of the plurality of pairs; determining, for the given one of the plurality of pairs, the weight factor as an inverse value of normal vectors located in the given face of the polyhedron.

In some implementations of the method, the determining the weight factor comprises: approximating the distribution of the plurality of normal vectors with a normal distribution with predetermined parameters, and predicting, using the Bayesian inference, the density of occurrence of the normal vector in the distribution of the plurality of normal vectors; determining, for the given one of the plurality of pairs, the weight factor as an inverse value of normal vectors occurrence of the normal vector in the distribution of the plurality of normal vectors.

In some implementations of the method, determining, by the electronic device, an adjusted weight factor if the weight factor is outside a pre-determined range, the adjusted weight factor being a closest value to the weight factor inside the pre-determined range.

In accordance with another broad aspect of the present technology, there is provided a method of executing an Iterative Closest Point (ICP) algorithm on digital datasets in a multidimensional space. The digital datasets comprise (i) a first dataset having a plurality of first data points, and (ii) a second dataset having a plurality of second data points and a plurality of normal vectors, a given second data point from the plurality of second data points being associated with a respective normal vector from the plurality of normal vectors. The method is executable by an electronic device. The method comprises, during execution of the ICP algorithm: determining, by the electronic device, a plurality of pairs of data points based on at least some of the plurality of first data points and at least some of the plurality of second data points, a given one of the plurality of pairs including (i) a respective first data point and (ii) a respective second data point; determining, by the electronic device, pair-specific error values for respective ones of the plurality of pairs, a given pair-specific error value being indicative of a distance measurement for the respective one of the plurality of pairs in the multidimensional space, weighting, by the electronic device, the pair-specific error values by respective weighting factors, thereby determining weighted pair-specific error values, a given weighting factor for a respective one of the plurality of pairs being inversely proportional to a density of occurrence of the normal vector of the second data point in the respective one of the plurality of pairs in a distribution of the plurality of normal vectors, such that: (i) the more the plurality of normal vectors has vectors that are similar to the normal vector of the second data point in the respective one of the plurality of pairs, the more the weighted pair-specific error value of the respective one of the plurality of pairs is reduced in comparison to the respective pair-specific error value, and (i) the less the plurality of normal vectors has vectors that are similar to the normal vector of the second data point in the respective one of the plurality of pairs, the more the weighted pair-specific error value of the respective one of the plurality of pairs is increased in comparison to the respective pair-specific error value; and determining, by the electronic device, a global error value for the second dataset as a sum of the weighted pair-specific error values, the global error value being a measurement of a pre-determined error metric that is to be minimized during the execution of the ICP algorithm.

In accordance with yet another broad aspect of the present technology, there is provided an electronic device. The electronic device comprises: a processor; a non-transitory computer-readable medium comprising instructions, the instructions for executing at least an Iterative Closest Point (ICP) algorithm, a communication interface for communicating with a sensor mounted on a vehicle. The non-transitory computer-readable medium stores at least: (i) a first dataset having a plurality of first data points, and (ii) a second dataset having a plurality of second data points and a plurality of normal vectors, a given second data point from the plurality of second data points being associated with a respective normal vector from the plurality of normal vectors. The processor, upon executing the instructions, is configured to: determine a plurality of pairs of data points based on at least some of the plurality of first data points and at least some of the plurality of second data points, a given one of the plurality of pairs including (i) a respective first data point and (ii) a respective second data point; determine a pair-specific error values for respective ones of the plurality of pairs, a given pair-specific error value being indicative of a distance measurement for the respective one of the plurality of pairs in the multidimensional space, weight the pair-specific error values by respective weighting factors, thereby determining weighted pair-specific error values, given weighting factor for a respective one of the plurality of pairs being inversely proportional to a density of occurrence of the normal vector of the second data point in the respective one of the plurality of pairs in a distribution of the plurality of normal vectors, determine a global error value for the second dataset as a sum of the weighted pair-specific error values, the global error value being a measurement of a pre-determined error metric that is to be minimized during the execution of the ICP algorithm.

In some implementations of the electronic device, the processor, prior to determining the plurality of pairs, is configured to: select (i) the at least some of the plurality of first data points from the plurality of first data points and (ii) the at least some of the plurality of second data points from the plurality of second data points.

In some implementations of the electronic device, the processor has been pre-configured to: apply a uniform sampling algorithm onto at least one of the plurality of first data points and the plurality of second data points; apply a random sampling algorithm onto at least one of the plurality of first data points and the plurality of second data points; and apply a normal-vector-distribution algorithm onto at least one of the plurality of first data points and the plurality of second data points.

In some implementations of the electronic device, for determining the given one of the plurality of pairs, the processor is configured to determine, for a given one of the at least some of the plurality of second data points, a closest first data point from the at least some of the plurality of the first data points to the given one of the at least some of the plurality of second data points.

In some implementations of the electronic device, the processor is further configured to apply one of a point-to-point error metric and a point-to-plane error metric.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
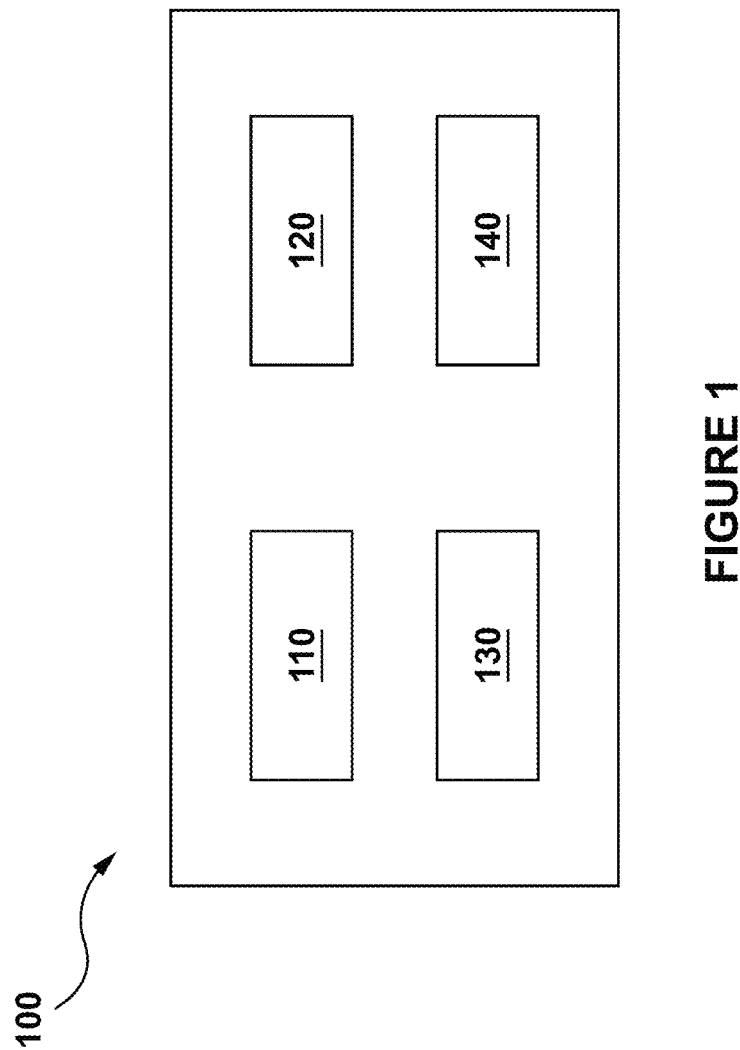
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components, such as a network communication module 140 for communication, via a communication network (for example, a communication network 245 depicted in FIG. 2) with other electronic devices and/or servers, localization modules (not depicted), and the like.

Figure 2:
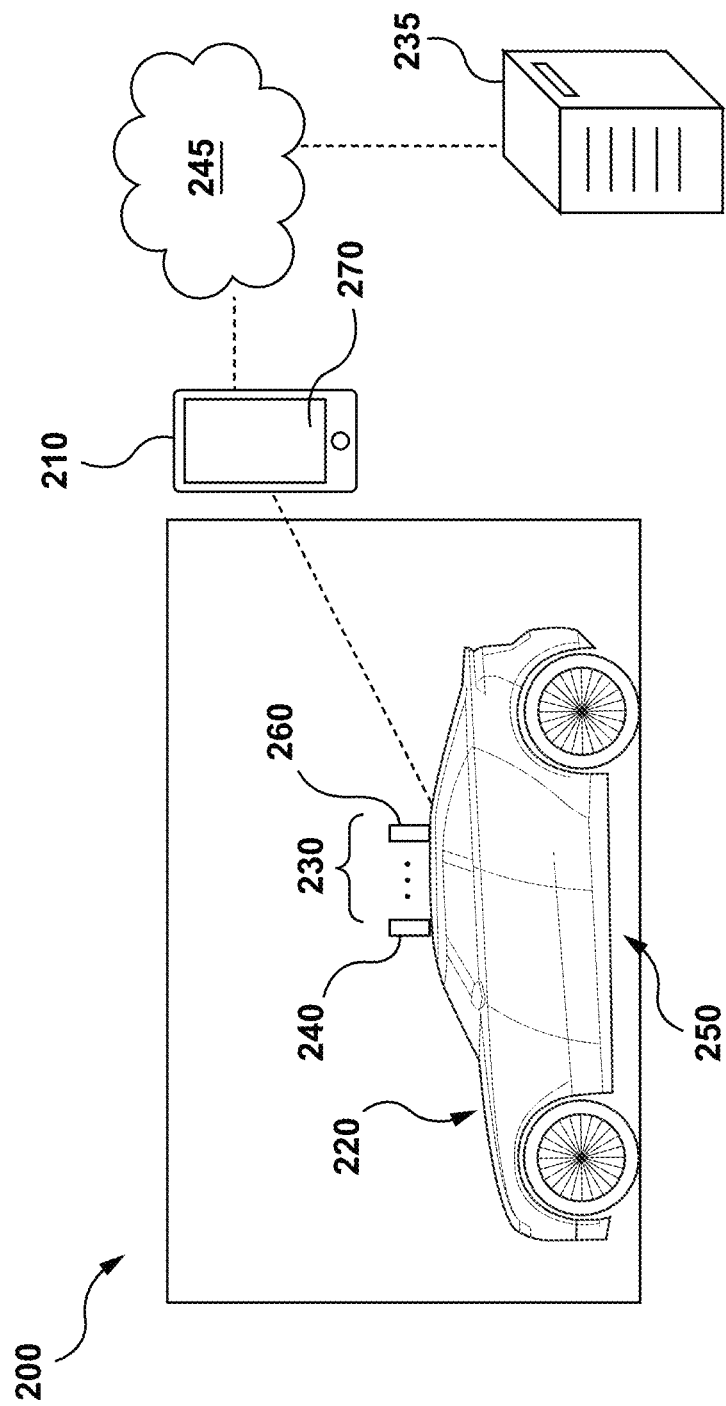
FIG. 2 depicts a networked computing environment being suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220, a server 235 in communication with the electronic device 210 via a communication network 245 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™ vehicle navigation device, Garmin™ vehicle navigation device), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, the solid-state drive 120 and the memory 130. In other words, the electronic device 210 comprises hardware and/or software and/or firmware, or a combination thereof, for determining the presence of an object around the vehicle 220, as will be described in greater detail below.

In accordance with the non-limiting embodiments of the present technology, the electronic device 210 further comprises or has access to a plurality of sensors 230. According to these embodiments, the plurality of sensors 230 may comprise sensors allowing for various implementations of the present technology. Examples of the plurality of sensors include but are not limited to: cameras, LIDAR sensors, and RADAR sensors, etc. Each of the plurality of sensors 230 is operatively coupled to the processor 110 for transmitting the so-captured information to the processor 110 for processing thereof, as will be described in greater detail herein below.

Each or some of the plurality of sensors 230 can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, each or some of the plurality of sensors 230 can be mounted in a dedicated enclosure (not depicted) mounted on the top of the vehicle 220.

Further, the spatial placement of each or some of the plurality of sensors 230 can be designed taking into account the specific technical configuration thereof, configuration of the enclosure, weather conditions of the area where the vehicle 220 is to be used (such as frequent rain, snow, and other elements) or the like.

In some non-limiting embodiments of the present technology, the plurality of sensors comprises at least a first sensor 240 and a second sensor 260. In these embodiments, both the first sensor 240 and the second sensor 260 can be configured to capture a 3D point cloud data of the surrounding area 250 of the vehicle 220. In this regard, each of the first sensor 240 and the second sensor 260 may comprise a LIDAR instrument.

LIDAR stands for LIght Detection and Ranging. It is expected that a person skilled in the art will understand the functionality of the LIDAR instrument, but briefly speaking, a transmitter (not depicted) of one of the first sensor 240 and the second sensor 260 implemented as the LIDAR sends out a laser pulse and the light particles (photons) are scattered back to a receiver (not depicted) of one of the first sensor 240 and the second sensor 260 implemented as the LIDAR instrument. The photons that come back to the receiver are collected with a telescope and counted as a function of time. Using the speed of light ($\sim 3\times 10^8$ m/s), the processor 110 can then calculate how far the photons have traveled (in the round trip). Photons can be scattered back off of many different entities surrounding the vehicle 220, such as other particles (aerosols or molecules) in the atmosphere, other cars, stationary objects or potential obstructions in front of the vehicle 220.

In a specific non-limiting example, each one of the first sensor 240 and the second sensor 260 can be implemented as the LIDAR-based sensor that may be of the type available from Velodyne LiDAR, Inc. of 5521 Hellyer Avenue, San Jose, Calif. 95138, the United States of America. It should be expressly understood that the first sensor 240 and the second sensor 260 can be implemented in any other suitable equipment.

However, in the non-limiting embodiments of the present technology, the first sensor 240 and the second sensor 260 do not have to be implemented based on the same LIDAR-based sensor, as such, respective technical characteristics of the first sensor 240 may differ from those of the second sensor 260.

In some embodiments of the present technology, the first sensor 240 and the second sensor 260 can be housed in the above-mentioned enclosure (not separately depicted) located on the roof of the vehicle 220. Further, in the non-limiting embodiments of the present technology, the plurality of sensors 230 may comprise more than LIDAR-based sensors, such as three or any other suitable number. In these embodiments, all LIDAR-based sensors, along with the first sensor 240 and the second sensor 260, can be housed in the above-mentioned enclosure (not separately depicted).

In the non-limiting embodiments of the present technology, the first sensor 240 and the second sensor 260 are calibrated such that for a first 3D point cloud captured by the first sensor 240 and a second 3D point cloud captured by the second sensor 260, the processor 110 is configured to identify overlapping regions by merging the first 3D point cloud and the second 3D point cloud. This calibration can be executed during the manufacturing and/or set up of the vehicle 220. Or at any suitable time thereafter or, in other words, the calibration can be executed during retrofitting the vehicle 220 with the first sensor 240 and the second sensor 260 in accordance with the non-limiting embodiments of the present technology contemplated herein. Alternatively, the calibration can be executed during equipping the vehicle 220 with the first sensor 240 and the second sensor 260 in accordance with the non-limiting embodiments of the present technology contemplated herein. How the calibration is executed by the processor 110 will be described in greater detail below with reference to FIGS. 4 to 11.

In some non-limiting embodiments of the present technology, the first sensor 240 and the second sensor 260 may be mounted onto the vehicle 220 in such a way that they both "observe" one and the same scene of the surrounding area 250. In other words, each of the first sensor 240 and the second sensor 260 may be non-rotational LIDAR-based sensors.

In some non-limiting embodiments of the present technology, each of the first sensor 240 and the second sensor 260 may be rotational LIDAR-based sensors, each operating with its pre-determined scanning frequency. Accordingly, in these embodiments, the processor 110 may be configured to synchronize, for example, the first sensor 240 with the second sensor 260 by adjusting the associated scanning frequencies such that, at a given moment in time, the first sensor 240 and the second sensor 260 are at a same angular position relative to their respective vertical central axes. By so doing, the processor 110 is configured to cause the first sensor 240 and the second sensor 260 to capture 3D data indicative of one and the same scene of the surrounding area 250 of the vehicle 220.

In the non-limiting embodiments of the present technology, the synchronization of the first sensor 240 and the second sensor 260 may be initialized, by the processor 110, inter alia, during maintenance periods of the vehicle 220; at moments of starting the vehicle 220; or during the operation of the vehicle 220 with a certain periodicity.

In the non-limiting embodiments of the present technology, the plurality of sensors 230 may further comprise other sensors (not depicted), such as cameras, radars, Inertial Measurement Unit (IMU) sensors, and the like.

In some non-limiting embodiments of the present technology, the communication network 245 is the Internet. In alternative non-limiting embodiments, the communication network 245 can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 245 is implemented will depend, inter alia, on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 245 may also use a wireless connection with the server 235.

In some embodiments of the present technology, the server 235 is implemented as a conventional computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 235 is a single server. In alternative non-limiting embodiments of the present technology (not depicted), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

In the description provided herein, when certain processes and method steps are executed by the processor 110 of the electronic device 210, it should be expressly understood that such processes and method steps can be executed solely by the processor 110, in a shared manner (i.e. distributed) between the processor 110 and the server 235, or solely by the server 235. In other words, when the present description refers to the processor 110 or the electronic device 210 executing certain processes or method steps, it is to expressly cover processes or steps executed by the processor 110, by the server 235, or jointly executed by the processor 110 and the server 235.

Figure 3:
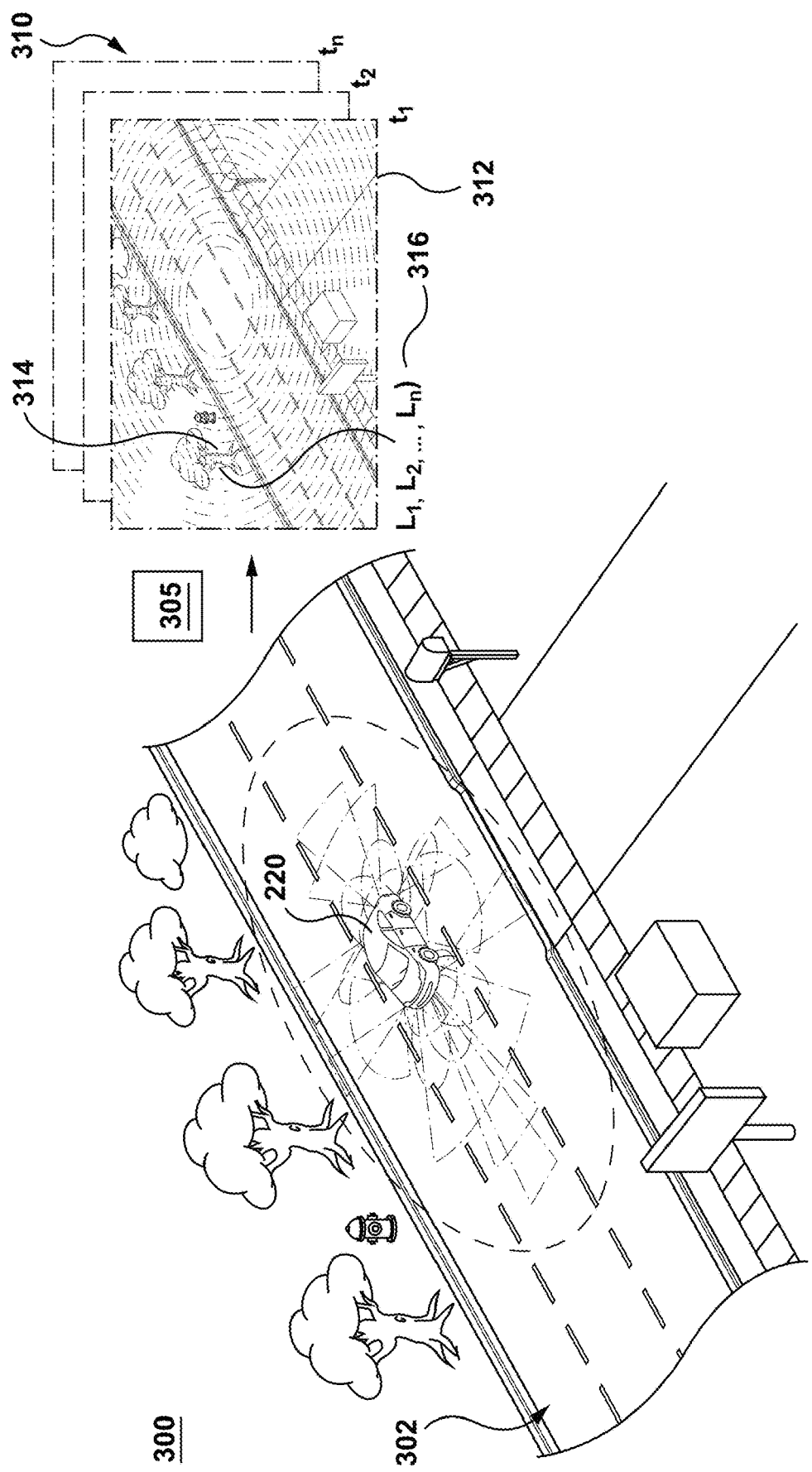
FIG. 3 depicts a LIDAR data acquisition procedure executed by a processor of an electronic device of the networked computing environment of FIG. 2, and more specifically, the procedure for receiving the 3D point cloud data captured by one of sensors of a vehicle present in the networked computing environment of FIG. 2.

With reference to FIG. 3, there is depicted a process 300 (also referred to as a LIDAR data acquisition procedure 300), executed by the processor 110, for receiving the 3D point cloud data 310 captured by one of the first sensor 240 and the second sensor 260. For the sake of simplicity, the description below in respect of the LIDAR data acquisition procedure 300 will be provided only for the first sensor 240 as, according to the non-limiting embodiments of the present technology, executing the LIDAR data acquisition procedure 300 using the second sensor 260 is not sufficiently different.

In some non-limiting embodiments of the present technology, the process 300 of receiving the 3D point cloud data 310 can be executed in a continuous manner. In other embodiments of the present technology, the process 300 of receiving the 3D point cloud data 310 can be implemented at pre-determined intervals, such every 2 milliseconds or any other suitable time interval.

To execute the LIDAR data acquisition procedure 300, as the vehicle 220 travels on a road 302, the processor 110 of the electronic device 210 is configured to acquire with the first sensor 240 sensor data 305 representative of objects in the surrounding area 250 of the vehicle 220. The vehicle 220 travels on the road 302, and the processor 110 is configured to cause the first sensor 240 to acquire data about the surrounding area 250 of the vehicle 220 at different locations on the road 302.

The processor 110 receives the sensor data 305 representative of objects in the surrounding area 250 of the vehicle 220 at different locations on the road 302 in the form of 3D point cloud 312.

Generally speaking, the 3D point cloud 312 is a set of LIDAR points in the form of a 3D point cloud, where a given LIDAR point 314 is a point in 3D space indicative of at least a portion of a surface of a given object on or around the road 302. In some non-limiting embodiments of the present technology, the 3D point cloud 312 may be organized in layers, where points in each layer are also organized in an elliptical fashion and the starting points of all elliptical layers are considered to share a similar orientation.

The given LIDAR point 314 in the 3D point cloud 312 is associated with LIDAR parameters 316 (depicted in FIG. 3 as $L_1$, $L_2$, and $L_N$). As a non-limiting example, the LIDAR parameters 316 may include: distance, intensity, and angle, as well as other parameters relating to information that may be acquired by the first sensor 240. The first sensor 240 may acquire a 3D point cloud at each time step t while the vehicle 220 is travelling, thereby acquiring a set of 3D point cloud data 310.

It is contemplated that in some non-limiting embodiments of the present technology, the vehicle 220 can also acquire images with a camera (not depicted) of the plurality of sensors 230 and enrich the 3D point cloud 312 with the image data obtained from the camera. The process for enriching 3D point cloud 312 with the image data obtained by the camera is described in a co-owned patent application entitled METHODS AND SYSTEMS FOR COMPUTER-BASED DETERMINING OF PRESENCE OF OBJECTS, bearing an application Ser. No. 16/369,865 filed with the United States Patent and Trademark Office on Mar. 29, 2019, and having an attorney docket 102351-002; the content of which is hereby incorporated by reference in its entirety.

Figure 4:
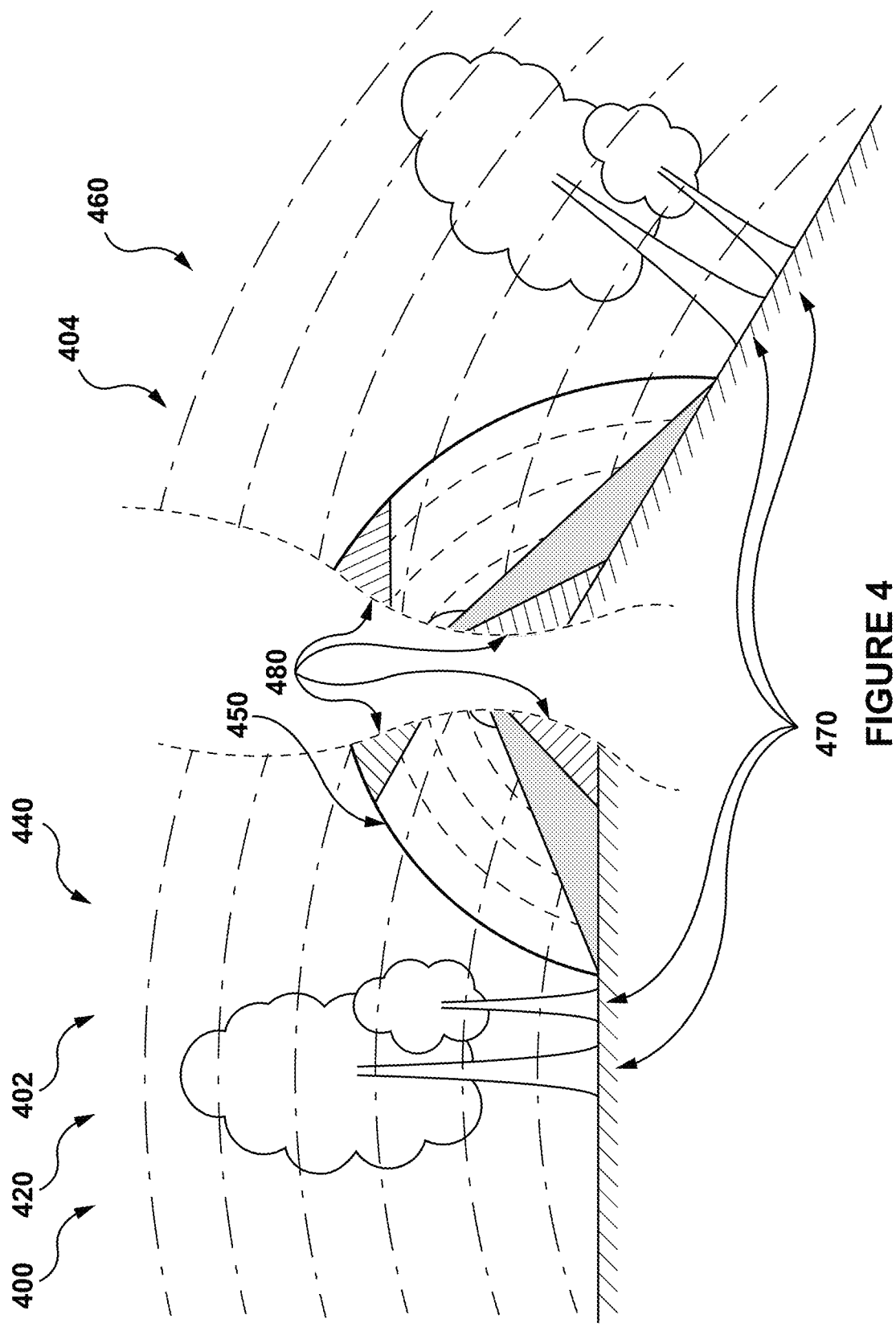
FIG. 4 schematically depicts a scene of the surrounding area represented by two independently generated, by the sensors of the vehicle present in the networked computing environment of FIG. 2, 3D point clouds, in accordance with the non-limiting embodiments of the present technology.

With reference to FIG. 4, there is schematically depicted a 3D representation 420 of a given scene 400 of the surrounding area 250 of the vehicle 220, according to the non-limiting embodiments of the present technology. In the depicted embodiments, the 3D representation 420 of the given scene 400 comprises two portions: a first portion 402 and a second portion 404. The first portion 402 is represented by a first 3D point cloud 440 generated by the first sensor 240. The second portion 404 is represented by a second 3D point cloud 460 generated by the second sensor 260. Both the first 3D point cloud 440 and the second 3D point cloud 460 represent a plurality of objects located in the scene 400: for example, a given object 450 (a hangar), and other objects 470.

In the non-limiting embodiments of the present technology, the processor 110 is configured to cause the first sensor 240 and the second sensor 260 to operate independently.

Thus, as it can be appreciated from FIG. 4, the first 3D point cloud 440 and the second 3D point cloud 460 represent, in the 3D representation 420, the given object 450 as well as the other objects 470 being "torn" between the first portion 402 and the second portion 404 of the 3D representation 420. Accordingly, in order to use the 3D representation 420, for example, for object detection in the given scene 400 or building a 3D map thereof, the processor 110 should be configured to merge the first 3D point cloud 440 and the second 3D point cloud 460, thereby generating a merged 3D representation of the scene 400 (for example, a 3D representation 1020 depicted in FIG. 11).

However, the merging the first 3D point cloud 440 and the second 3D point cloud 460 may be associated with certain technical challenges that include, inter alia: (1) the first 3D point cloud 440 and the second 3D point cloud 460 are misaligned, for example, due to the first sensor 240 and the second sensor 260 operating in different coordinate systems, and (2) both the first 3D point cloud 440 and the second 3D point cloud 460 include a plurality of overlapping regions 480.

Broadly speaking, the plurality of overlapping regions 480 includes LIDAR points that are present in both the first 3D point cloud 440 and the second 3D point cloud 460, however, are representative of one and the same regions in the scene 400.

Therefore, the non-limiting embodiments of the present technology have been developed in an attempt to overcome the identified technical challenges to ensure that corresponding LIDAR points of the plurality of overlapping regions 480 in the first 3D point cloud 440 and the second 3D point cloud 460 can be merged with an appropriate level of accuracy. This, consequently, allows for generating such the merged 3D representation 1020 of the scene 400 allowing for a more accurate object detection therein and building a reliable 3D map.

The process of merging the corresponding LIDAR points of the plurality of overlapping regions 480 in the first 3D point cloud 440 and in the second 3D point cloud will now be described with reference to FIGS. 5 to 11.

In this regard, according to the non-limiting embodiments of the present technology, the processor 110 may be configured to execute, for the first 3D point cloud 440 and the second 3D point cloud 460, an Iterative Closest Point (ICP) algorithm.

Broadly speaking, the ICP algorithm is configured to minimize difference between two 3D point clouds. In the ICP algorithm, one 3D point cloud is kept fixed and is referred to as a "target" or a "reference" 3D point cloud (in the described embodiments of the present technology, the first 3D point cloud 440), and the other 3D point cloud, referred to as a "source cloud" (in the described embodiments of the present technology, the second 3D point cloud 460) is transformed to best match the target 3D point cloud.

Typically, the ICP algorithm includes the following steps executed iteratively:
- selecting LIDAR points, from at least one of the first 3D point cloud 440 and the second 3D point cloud 460, to be merged (typically, from the target 3D point cloud);
- matching the selected LIDAR points, i.e. determining correspondences between the LIDAR points selected from the one of the first 3D point cloud 440 and the second 3D point cloud 460 selected above and the other of the first 3D point cloud 440 and the second 3D point cloud 460;
- weighting the determined corresponding LIDAR point pairs;
- rejecting, based on predetermined criteria, certain LIDAR point pairs;
- assigning an error metric; and
- minimizing the error metric by applying one of transformation rules.

Depending on approaches to executing each of the above-listed steps, there may be many variants of the ICP algorithm, certain of which are described in the article entitled "Efficient Variants of the ICP Algorithm," written by Szymon Rusinkiewicz and Marc Levoy, and published by Stanford University; the content of which is hereby incorporated by reference in its entirety.

In the non-limiting embodiments of the present technology, the transformation rules may include a translation rule and a rotation rule. Each transformation rule is used to apply a respective rigid transformation of the second 3D point cloud 460 relative to the first 3D point cloud 440.

Thus, it can be said that, by iteratively applying transformation rules to minimize the error metric between the corresponding LIDAR points in the plurality of overlapping regions 480, the processor 110 causes the second 3D point cloud 460 to go through a plurality of intermediate positions to a final position, at which the selected LIDAR point pairs of the plurality of overlapping regions 480 are substantially merged. In other words, the processor 110, by executing the ICP algorithm, repeatedly executes the steps applying the transformation rules until the error metric achieves a predetermined error threshold value.

The non-limiting embodiments of the present technology are set forth herein to provide methods for determining weights, for each of at least one of the first 3D point cloud 440 and the second 3D point cloud 460 for further use by the ICP algorithm at different stages. The process of determining the weights will be now described with reference to FIGS. 5 to 7.

Determining Weights for LIDAR Points

In the non-limiting embodiments of the present technology, the weights are assigned based on a weight factor. In the non-limiting embodiments of the present technology, the weight factor may be indicative of a frequency (density) of occurrence of normal vectors having a same angular orientation as a normal vector associated with a given LIDAR point in a distribution of normal vectors associated with LIDAR points of a given 3D point cloud.

To that end, before executing the ICP algorithm, the processor 110 is configured to generate, for both of the first 3D point cloud 440 and the second 3D point cloud 460, a single multidimensional space, and then is configured to pre-calculate associated normal vectors. Thus, in the non-limiting embodiments of the present technology, first, the processor 110 is configured to project, or in other words transform, both the first 3D point cloud 440 and the second 3D point cloud 460 into a single multidimensional space, thereby generating an initial position thereof.

Figure 5:
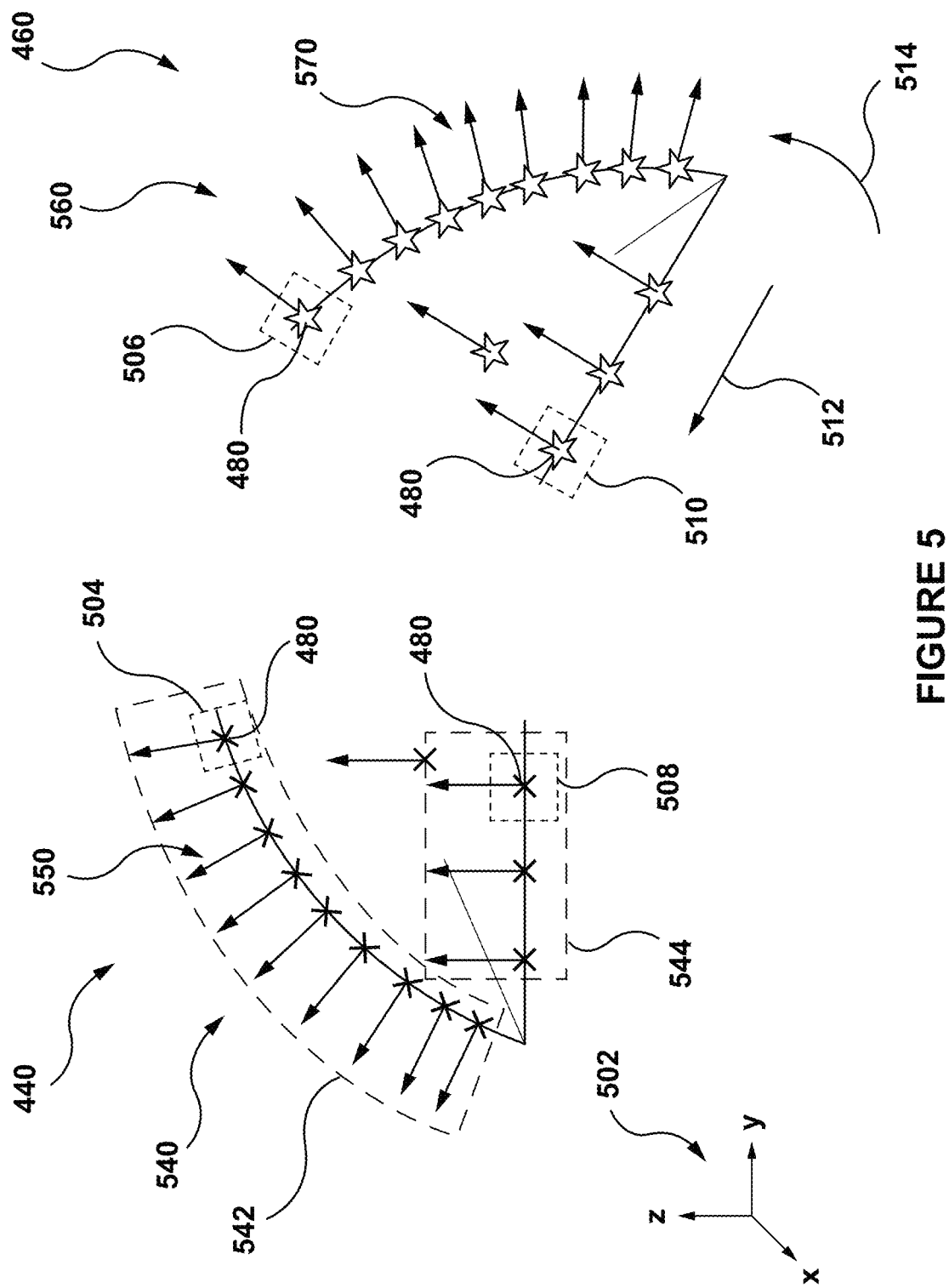
FIG. 5 schematically depicts an initial position of the 3D point clouds represented in a multidimensional space generated by the processor of the electronic device of the networked computing environments of FIG. 2, in accordance with the non-limiting embodiments of the present technology.

With reference now to FIG. 5, there is schematically depicted the initial position of the first 3D point cloud 440 and the second 3D point cloud 460 placed in a multidimensional space 502 for executing the ICP algorithm, according to the non-limiting embodiments of the present technology.

Although in the embodiments of FIG. 5, the multidimensional space 502 is depicted as three-dimensional Cartesian coordinates, it should be expressly understood that it can be, for example, a four-dimensional space, or can represent a space of even higher dimension depending on a number of parameters for describing LIDAR points of the first 3D point cloud 440 and the second 3D point cloud 460, without departing from the scope of the present technology.

Thus, in the multidimensional space 502 depicted in FIG. 5, the first 3D point cloud 440 is represented by a first plurality of LIDAR points 540, and the second 3D point cloud 460 is represented by a second plurality of LIDAR points 560.

Also, as it can be appreciated from FIG. 5, given points 504, 506, 508, and 510 belong to some of the plurality of overlapping regions 480. Thus, practically speaking, in order to generate the merged 3D representation 1020, the processor 110, executing the ICP algorithm, is configured, by applying one of the translation rule (a direction of which being depicted, in FIG. 5, at 512) and the rotation rule (a direction of which being depicted, in FIG. 5, at 514), to minimize distances between the given points 504 and 506, and the given points 508 and 510, respectively, hence merging them with each other.

Further, in the non-limiting embodiments of the present technology, the processor 110 is configured to pre-calculate, for each of the first plurality of LIDAR points 540 and the second plurality of LIDAR points 560, a respective normal vector. Certain approaches to calculating normals to LIDAR points based on neighboring LIDAR points in a 3D point cloud that can be used for configuring the processor 110 therefor are described in an article entitled "*Fast and Accurate Computation of Surface Normals from Range Images*", written by H. Badino, D. Huber, Y. Park and T. Kanade and published by the Institute of Electrical and Electronics Engineers; the content of which is hereby incorporated by reference.

Thus, the processor 110 is configured to pre-calculate a first plurality of normal vectors 550 corresponding to the first plurality of LIDAR points 540, and a second plurality of normal vectors 570 corresponding to the second plurality of LIDAR points 560. In some non-limiting embodiments of the present technology, the processor 110 may be configured to generate only one of the first plurality of normal vectors 550 and the second plurality of normal vectors 570.

Having projected the LIDAR points of the two 3D point clouds into the multidimensional space 502 and pre-calculated respective normal vectors, the processor 110 now proceeds to determine, for each of at least one of the first plurality of LIDAR points 540 and the second plurality of LIDAR points, associated values of the weight factor. It should be expressly understood that, in the context of the present technology, assigning a value of the weight factor to a given LIDAR point is also to mean assigning the same value of the weight factor to a normal vector associated with the given LIDAR point.

In the non-limiting embodiments of the present technology, as mentioned above, a value of the weight factor, for a given normal vector in a respective one of the first plurality of normal vectors 550 and the second plurality of normal vectors 570, is determined as a value inversely proportional to a density of occurrence of other normal vectors having a same angular position in a distribution of the respective one of the first plurality of normal vectors 550 and the second plurality of normal vectors 570. In other words, a value of the weight factor assigned to the given normal vector is indicative of how "popular", in terms of its angular orientation, the given vector is in a given plurality of normal vectors. The "rarer" a normal vector is, the greater a value of the weight factor is assigned thereto and to the associated LIDAR point, and vice versa. Analytically, the weight factor can be formulated as follows:

$$\varphi_i \sim \frac{1}{\rho(n_i)}, \quad \text{(Equation 1)}$$

where $\varphi_i$ is a given value of the weight factor $\varphi$ for an i-th LIDAR point;
$n_i$ is a normal vector at the i-th LIDAR point; and
$\rho(n_i)$ is a density of distribution of neighboring LIDAR points, in a respective plurality of LIDAR points, associated with normal vectors having a same angular position as $n_i$.

According to the non-limiting embodiments of the present technology, in order to generate a distribution of normal vectors from a given plurality of normal vectors, the processor 110 is configured to represent each of the given plurality of normal vectors on a sphere of predetermined dimensions. Such spherical representation allows for better visualization of normal vectors as aiding to resolve occlusions that may have been present initially, which eventually allows for effective clustering of normal vectors based on their angular orientation.

Figure 6:
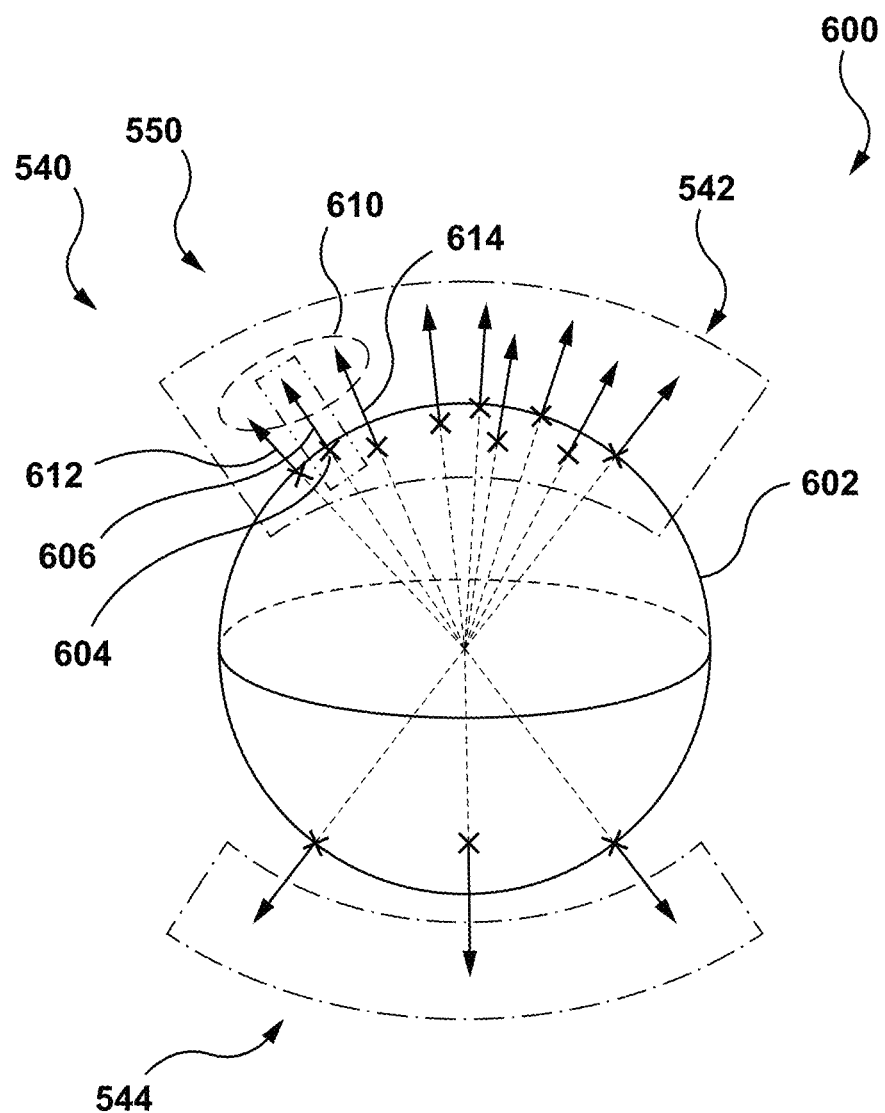
FIG. 6 depicts a method for determining, by the processor of the electronic device of the networked computing environment of FIG. 2, values of a weight factor assigned to each one of at least one of the 3D point clouds, in accordance with the non-limiting embodiments of the present technology.

With reference now to FIG. 6, there is depicted a spherical representation 600 of the first plurality of LIDAR points 540 and the first plurality of normal vectors 550 associated therewith, for determining values of the weight factor for the LIDAR points, in accordance with the non-limiting embodiments of the present technology.

As it can be appreciated from FIG. 6, each of a first sub-plurality 542 and a second sub-plurality 544 of the first plurality of LIDAR points 540 are distinctly represented, by density thereof, on a sphere 602 as they are associated with surfaces of the given object 450, at which respective normal vectors have distinct angular positions.

Thus, the processor 110 may be configured to determine a given value of the weight factor based on a number of normal vectors contained in a predetermined neighbourhood 610. The size of the predetermined neighbourhood is indicative of a proximity parameter between the normal vectors and may depend, inter alia, on computational power of the processor 110.

In the depicted embodiments, a value of the weight factor $\varphi$ for a given LIDAR point 604 associated with a given normal vector 606 is determined based on a given normal vector 612 and another normal vector 614 located in the predetermined neighbourhood 610 in respect of the given normal vector 606. As such, the given LIDAR point 604 may be assigned with the value of the weight factor '⅓'.

As it can be further appreciated from FIG. 6, each LIDAR point of the second sub-plurality 544 would have higher values of the weight factor $\varphi$ than those from the first sub-plurality 542 as each of the first plurality of normal vectors 550 associated with a respective one from the second sub-plurality 544 is distributed with a lower value of density, and hence is "rarer", in the spherical representation 600, than any one of the first plurality of normal vectors 550 associated with a respective one from the first sub-plurality 542.

As using the spherical representation 600 for determining values of the weight factor co may be computationally costly for the processor 110 to perform, in some non-limiting embodiments of the present technology, instead of the sphere 602, the processor 110 may use an approximation thereof, for rendering a clustered representation for the given plurality of normal vectors.

As such approximation, a polyhedron, vertices of which are located on a sphere (for example, the sphere 602) may be used, according to the non-limiting embodiments of the present technology.

Figure 7:
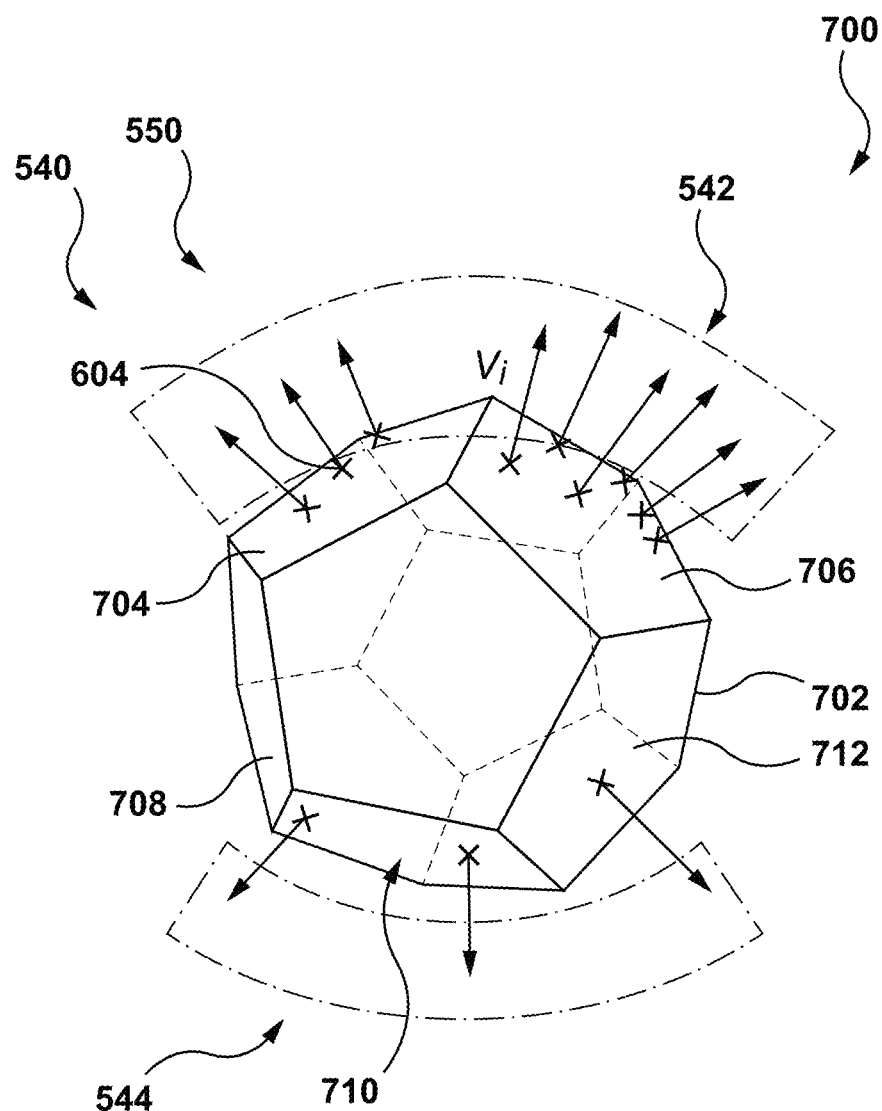
FIG. 7 schematically depicts another method for determining, by the processor of the electronic device of the networked computing environment of FIG. 2, values of the weight factor assigned to each one of at least one of the 3D point clouds, in accordance with the non-limiting embodiments of the present technology.

With reference to FIG. 7, there is schematically depicted a dodecahedral representation 700 of the first plurality of LIDAR points 540 and the first plurality of normal vectors 550 associated therewith, based on a regular dodecahedron 702, for determining values of the weight factor for the LIDAR points, in accordance with the non-limiting embodiments of the present technology.

In the depicted embodiments, each of the first plurality of LIDAR points 540 is distributed into a respective face of the regular dodecahedron 702 based on its proximity to one of vertices Vi. As such, LIDAR points of the first sub-plurality 542 have been distributed between given faces 704 and 706. Further, each of the second sub-plurality 544 has been distributed into a respective of faces 708, 710, and 712.

Consequently, based on the dodecahedral representation 700, the processor 110 may be configured to determine a given value of the weight factor $\varphi$, for a given one of the first plurality of LIDAR points 540, based on a number of neighbouring points in a respective face of the regular dodecahedron 702. Specifically, the given value of the weight factor $\varphi$, for a given LIDAR point, can be determined as a value inversely proportional to the number of neighbouring points in the respective faces. For example, each one the first plurality of LIDAR points 540 having fallen into the given face 704 would be assigned with a value of the weight factor $\varphi$'⅓'. Accordingly, each one of the first plurality of LIDAR points 540 having fallen into the given face 706 would be assigned with a value of the weight factor $\varphi$'⅕'. Finally, each one of the first plurality of LIDAR points having fallen into one of the given faces 708, 710, and 712 (belonging to the second sub-plurality 544) would be assigned a value of the weight factor $\varphi$'1'.

In additional non-limiting embodiments of the present technology, the processor 110 may be configured to approximate the distribution of the first plurality of LIDAR points 540 (and the first plurality of normal vectors 550 associated therewith) using one of a standard distributions, for example, a normal distribution with predetermined parameters. In this regard, the processor 110 may be configured to apply the Bayesian inference to predict a value of $\rho(n_i)$ for a given LIDAR point. Consequently, based on the predicted value of $\rho(n_i)$, the processor 110 may be further configured to determine an associated value of the weight factor $\varphi$. In other words, in accordance with some non-limiting embodiments of the present technology, the normal distribution can be used to approximate an actual distribution of the LIDAR points 540 (and the first plurality of normal vectors 550 associated therewith). In other words, the approximation attempts to determine the density of the first plurality of LIDAR points 540.

The procedure of determining values of the weight factor $\varphi$ described hereinabove with reference to FIGS. 6 and 7 also applies mutatis mutandis to the second plurality of LIDAR points 560 and the second plurality of normal vectors 570, associated therewith, of the second (source) 3D point cloud 460.

In terms of executing the ICP algorithm, in some non-limiting embodiments of the present technology, the so-determined respective values of the weight factor $\varphi$ may be used at the stage of weighting corresponding LIDAR point pairs for further calculating a respective value of an error metric (Scenario 1).

In other non-limiting embodiments of the present technology, the so-determined respective values of the weight factor $\varphi$ may be used at the stage of selecting LIDAR points from at least one of the first 3D point cloud 440 and the second 3D point cloud 460 (Scenario 2).

Thus, the description below in respect of each of the above-listed stages of executing the ICP algorithm will be provided in light of the two scenarios.

LIDAR Point Selection

As alluded to herein above, the first stage of executing the ICP algorithm is selecting, by the processor 110, LIDAR points from at least one of the first plurality of LIDAR points 540 and the second plurality of LIDAR points 560 for further use.

Scenario 1

In some non-limiting embodiments of the present technology, the processor 110 may be configured to use all of the first plurality of LIDAR points 540 and the second plurality of LIDAR points 560. In other non-limiting embodiments of the present technology, the processor 110 may be configured to selectively sample or selectively weigh LIDAR points.

In other non-limiting embodiments of the present technology, the processor 110 may be configured to select LIDAR points using a uniform sampling algorithm. Accordingly, referring back to FIG. 5, in these embodiments, from the first plurality of LIDAR points 540, for example, the processor 110 may be configured to sample more LIDAR points from the first sub-plurality 542 than from the second sub-plurality 544 due to substantially different numbers of LIDAR points contained therein.

In yet other non-limiting embodiments of the present technology, the processor 110 may be configured to randomly sample LIDAR points from at least one of the first plurality of LIDAR points 540 and the second plurality of LIDAR points 560 at each iteration of execution of the ICP algorithm.

In further non-limiting embodiments of the present technology, the selecting the LIDAR points may comprise applying, by the processor 110, a normal-vector-distribution algorithm. In accordance with the non-limiting embodiments of the present technology, the normal-vector-distribution algorithm is configured to sample LIDAR points based on orientation of the associated normal vectors. Thus, by applying the normal-vector-distribution algorithm, the processor 110 is configured to sample those LIDAR points, whose associated normal vectors have the same angular positions in the multidimensional space 502 within a predetermined uncertainty interval (for example, ±5°).

Scenario 2

In specific non-limiting embodiments of the present technology, the processor 110 is configured to sample each one of the first plurality of LIDAR points 540 and the second plurality of LIDAR points 560 based on the assigned respective values of the weight factor $\varphi$ determined as described above with reference to FIGS. 6 and 7. Continuing with the examples given above in respect of the first plurality of LIDAR points 540, after assigning respective values of the weight factor $\varphi$, the processor 110 is thus configured to sample more LIDAR points from the second sub-plurality 544 than from the first sub-plurality 542.

LIDAR Point Matching

Having sampled points from at least one of the first plurality of LIDAR points 540 and the second plurality of LIDAR points, the processor 110 executing the ICP algorithm is further configured to match each so-selected LIDAR point from the second plurality of LIDAR points 560 with a respective closest one from the first plurality of LIDAR points 540. By so doing, the processor 110 is configured to determine LIDAR point pairs (also referred to herein as "correspondences") from the two pluralities of LIDAR points. The stage of matching LIDAR points to generate LIDAR point pairs equally applies to both Scenario 1 and Scenario 2.

Figure 8:
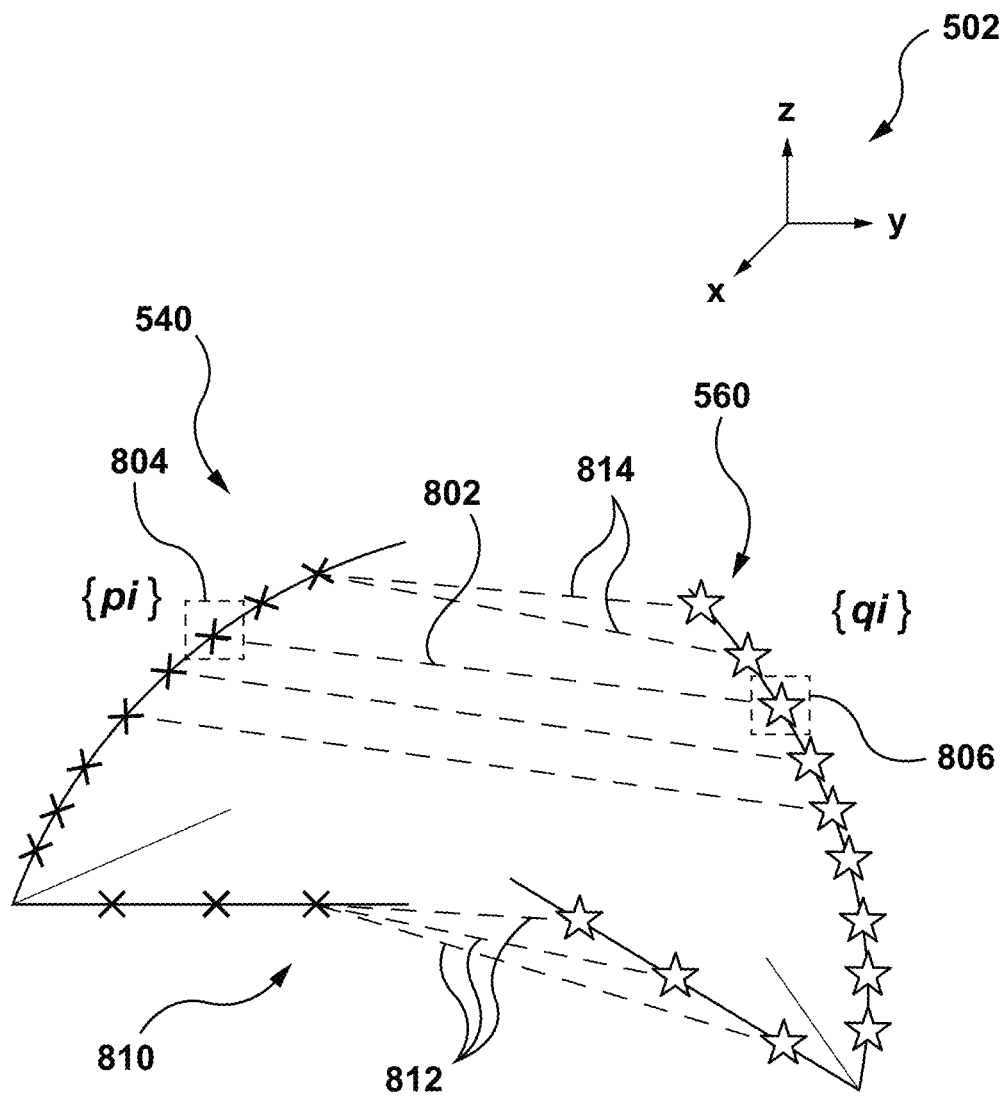
FIG. 8 schematically depicts a method for determining, by the processor of the electronic device of the networked computing environment of FIG. 2, correspondences between LIDAR points of the 3D point clouds in the multidimensional space of FIG. 5, in accordance with the non-limiting embodiments of the present technology.

In some non-limiting embodiments of the present technology, the processor 110 may be configured to determine LIDAR point pairs based on a shortest distance therebetween. As depicted in FIG. 8, for a given LIDAR point 806 of the second plurality of LIDAR points 560, a corresponding LIDAR point 804 from the first plurality of LIDAR points 540 has been determined based on a shortest distance therebetween in the multidimensional space 502. Thus, the given LIDAR point 806 of the second plurality of LIDAR points 560 and the corresponding one from the first plurality of LIDAR points 540 form a given LIDAR point pair 802 $\{p_i, q_i\}$.

In some non-limiting embodiments of the present technology, the given LIDAR point pair 802 $\{p_i, q_i\}$ may be determined not only based on the shortest distance between the given LIDAR points 804 and 806, but also based on a compatibility of normal vectors thereof. In the context of the present technology, the term "compatibility of normal vectors" of two given LIDAR points 804 and 806 is to mean that a normal vector associated with the given LIDAR point 804 has an angular position, in the multidimensional space 502, within a predetermined angular threshold value (for example, 45°).

Accordingly, determining correspondences in the first plurality of LIDAR points 540 for each of the selected ones of the second plurality of LIDAR points 560, the processor 110 is configured to generate a plurality of LIDAR point pairs 810.

Figure 9:
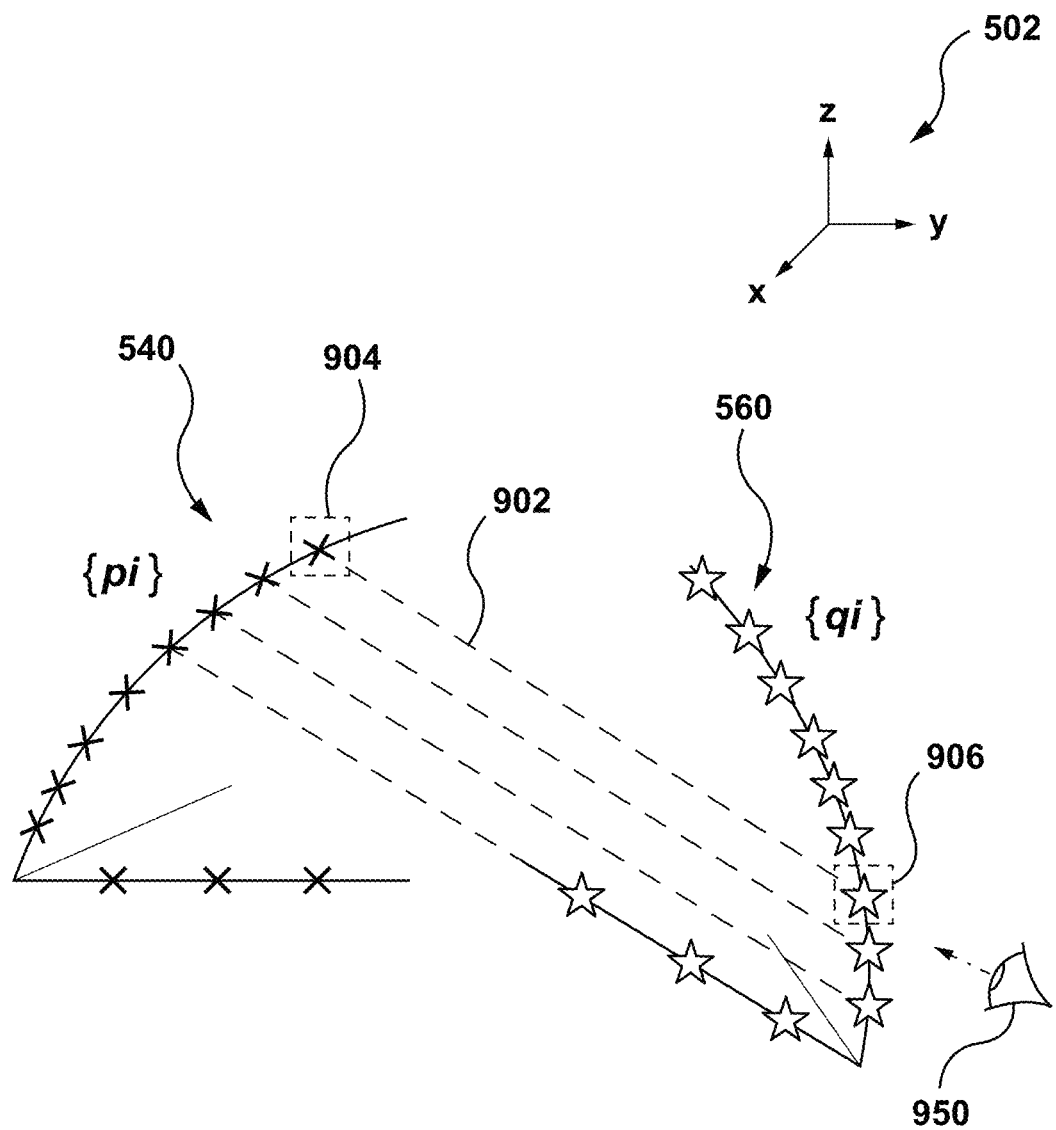
FIG. 9 schematically depicts another method for determining, by the processor of the networked computing environment of FIG. 2, correspondences between LIDAR points of the 3D point clouds in the multidimensional space of FIG. 5, in accordance with the non-limiting embodiments of the present technology.

In other non-limiting embodiments of the present technology, the processor 110 is configured to determine the correspondences based on a projection technique. Referring to FIG. 9, for a given LIDAR point 906 of the second plurality of LIDAR points 560, a corresponding LIDAR point 904 from the first plurality of LIDAR points 540 has been determined as a projection of the given LIDAR point onto the first plurality of LIDAR points 540 from a point of view of an imaginary observer 950 located in the second plurality of LIDAR points 560, whereby a given LIDAR point pair 902 is determined $\{p_i, q_i\}$.

Other approaches to determining the correspondences between so-selected LIDAR points of the second plurality of LIDAR points 560 and the first plurality of LIDAR points 540 may become apparent to a person skilled in the art, and as such, may be used without departing from the scope of the present technology.

Weighting Correspondences

In the non-limiting embodiments of the present technology, having determined the correspondences, the processor 110 may be further configured to assign respective values of a weight factor to each of them. Broadly speaking, a given weight assigned to a given LIDAR point pair is indicative of its significance when calculating the error metric.

In the non-limiting embodiments of the present technology, the processor 110 is configured to determine minimal and maximal values for a given weight factor, thereby determining an associated range therefor. In this regard, if a given value of the given weight factor is outside its associated range, the processor 110 may be configured to adjust the given value to the closest one of the maximal or minimal values inside the associated range. The adjusted given value is hence used for weighting the correspondences.

Scenario 1

In the non-limiting embodiments of the present technology, as alluded to above, the processor 110 is configured to apply the weight factor φ to weight each of the so-determined LIDAR point pairs $\{p_i, q_i\}$, respective values of which are determined as set forth above with reference to FIGS. 6 and 7. In this regard, the processor 110 is configured to assign, to each of the so-determined LIDAR point pairs $\{p_i, q_i\}$, a value of the weight factor φ associated with a respective one of the second plurality of LIDAR points 560.

Scenario 2

In some non-limiting embodiments of the present technology, the processor 110 may be configured to use other approaches to determining the weight factor including assigning weights based on a distance between each of the LIDAR point pairs $\{p_i, q_i\}$, such that the greater the distance is, the lower the weight is; assigning weights based on a compatibility of normal vectors in each of the LIDAR point pairs $\{p_i, q_i\}$; and the like.

In other non-limiting embodiments of the present technology, the processor 110 may be configured to omit this stage of executing the ICP algorithm altogether.

Rejecting Outliers

In the non-limiting embodiments of the present technology, the processor 110 executing the ICP algorithm may be further configured to reject certain inconsistent LIDAR point pairs $\{p_i, q_i\}$, so-called outliers, based on predetermined criteria. The stage of rejecting outliers equally applies to both Scenario 1 and Scenario 2.

In some non-limiting embodiments of the present technology, the processor 110 may be configured to reject certain of the LIDAR point pairs $\{p_i, q_i\}$ based on a distance threshold value. For example, referring back to FIG. 8, the processor 110 may have determined that LIDAR points in a given LIDAR point pair 808 are located at a longer distance apart than the distance threshold value, and thus rejects it.

In some non-limiting embodiments of the present technology, the processor 110 may be configured to reject a certain percentage of worst LIDAR point pairs $\{p_i, q_i\}$ based on corresponding distances therebetween.

In other non-limiting embodiments of the present technology, the processor 110 may be configured to reject LIDAR point pairs $\{p_i, q_i\}$ including LIDAR points corresponding to boundaries of represented surfaces as such LIDAR points may be erroneously associated into LIDAR point pairs $\{p_i, q_i\}$. For example, referring back to FIG. 8, the processor 110 may reject correspondences 812 and 814 as LIDAR points, contained therein, are representative of surface boundaries of the given object 450, and as such they tend to form improper LIDAR point pairs.

At this stage of executing the ICP algorithm, the processor 110 is configured to finalize the process of selecting LIDAR points pairs $\{p_i, q_i\}$, to which the processor 110 is further configured to apply one of the transformation rules, thereby minimizing an assigned error metric, which will be immediately explained with reference to FIG. 10.

Assigning an Error Metric and Applying a Transformation

Scenario 1

Figure 10:
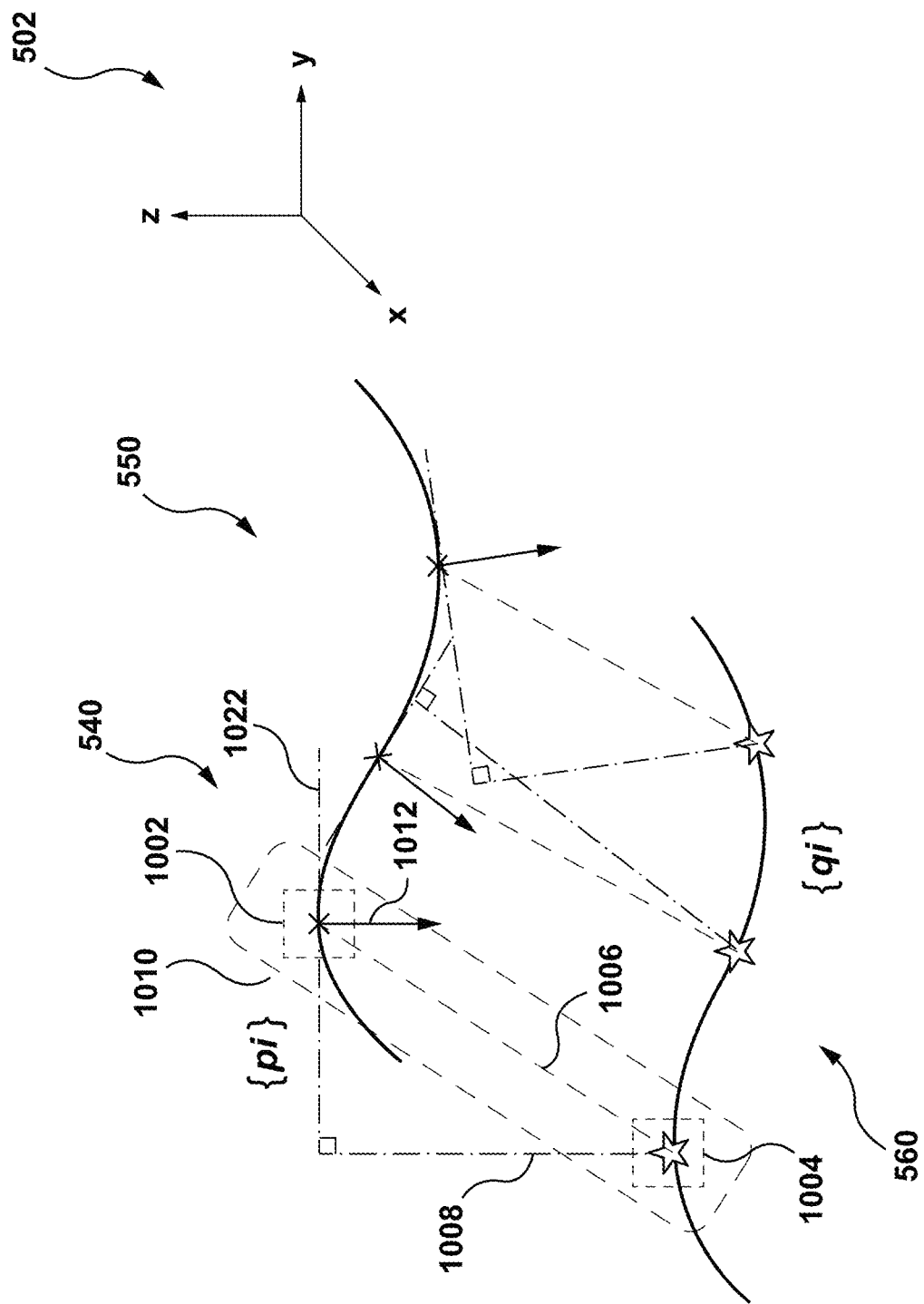
FIG. 10 schematically depicts a method for determining, by the processor of the electronic device of the networked computing environment of FIG. 2, an error metric for merging the correspondent LIDAR points of the 3D point clouds in the multidimensional space of FIG. 5, in accordance with the non-limiting embodiments of the present technology.

With reference now to FIG. 10, there is schematically depicted a process for assigning an error metric to be minimized in order for the second plurality of LIDAR points to be merged with the first plurality of LIDAR points 540 in the multidimensional space 502, in accordance with the non-limiting embodiments of the present technology.

In some non-limiting embodiments of the present technology, the processor 110 may be configured to apply a point-to-point error metric. In this regard, the processor 110 is configured, by applying one of the transformation rules, to minimize a sum of squared distances between LIDAR points in respective LIDAR point pairs $\{p_i, q_i\}$. Further, the processor 110 may be further configured to consider values of the weight factor φ predetermined and assigned to each one of the LIDAR point pairs $\{p_i, q_i\}$. Thus, the point-to-point error metric function $E_1$ may be analytically formulated as follows:

$$E_1 = \Sigma_i \varphi_i (p_i - Tq_i)^2, \quad \text{(Equation 2)}$$

where $p_i$ and $q_i$ are coordinate values of corresponding LIDAR points forming a given LIDAR point pair;

$\varphi_i$ is a respective value of the weight factor φ assigned to the given LIDAR point pair defined by Equation 1; and T is a rigid transformation corresponding to one of the transformation rules used at a given iteration of executing the ICP algorithm;

For example, the processor 110, at one of the above stages of executing the ICP algorithm, may have selected a given LIDAR point pair 1010 formed from a given one 1002 from the first plurality of LIDAR points 540 and another given one 1004 from the second plurality of LIDAR points 560. Accordingly, by applying the point-to-point error metric, the processor 110 is configured to minimize a distance 1006 between the LIDAR points 1002 and 1004 in the given LIDAR point pair 1010.

In other non-limiting embodiments of the present technology, instead of the point-to-point error metric, the processor 110 may be configured to apply a point-to-plane error metric. In these embodiments, the processor 110 is configured, by applying one of the transformation rules, to minimize a sum of squared distances between each one from the second plurality of LIDAR points 560 and a given plane containing a corresponding one, in a respective LIDAR point pair, from the first plurality of LIDAR points 540. In these embodiments, the given plane is perpendicular to an associated one from the first plurality of normal vectors 550. Given this, the point-to-plane error metric function $E_2$ can be formulated as follows:

$$E_2 = \Sigma_i \varphi_i |\langle n_i | p_i - Tq_i \rangle|, \quad \text{(Equation 3)}$$

where $p_i - Tq_i$ is a given distance vector connecting a given one from the second plurality of LIDAR points 560 and a corresponding one, in a given LIDAR point pair, from the first plurality of LIDAR points 540, in the multidimensional space 502; and $\langle n_i - Tq_i \rangle$ is a scalar production of the given distance vector with a normal vector at the corresponding one from the first plurality of LIDAR points 540.

Thus, in the depicted embodiments of FIG. 10, the processor 110, by applying the point-to-plane error metric, is configured to minimize a distance 1008 between the LIDAR points 1002 and 1004 in the given LIDAR point pair 1010.

Accordingly, in the non-limiting embodiments of the present technology, the processor 110 is configured to iteratively execute the above stages of the ICP algorithm applying one of the transformation rules, thereby minimizing one of the point-to-point error metric and the point-to-plane error metric up to a respective predetermined error threshold value. By so doing, the processor 110 adjusts, in the multidimensional space 502, the initial position of the second plurality of LIDAR points 560 relative to the first plurality of LIDAR points 540, thereby merging at least some of the second plurality of LIDAR points 560 with at least some of the first plurality of LIDAR points 540.

Scenario 2

In the non-limiting embodiments of the present technology, the processor 110 is configured to construct respective error metric functions in a fashion similar to the one described above according to Scenario 1 (i.e. based on Equations 2 and 3, respectively), however instead of the weight factor φ, the processor 110 can be configured to consider another corresponding weight factor, or omit the weight factor altogether. Akin to Scenario 1, the processor 110 is also configured to determine, for each of the constructed error metric function, a respective predetermined error threshold value.

In the non-limiting embodiments of the present technology, in both Scenario 1 and Scenario 2, when the respective predetermined error threshold value is reached, the processor 110 stops executing the ICP algorithm outputting a final position of the second plurality of LIDAR points 560. In this regard, the final position of the second plurality of LIDAR points 560 is a position of the second plurality of LIDAR points 560 at a last iteration of the ICP algorithm, at which the predetermine error threshold value was reached.

Figure 11:
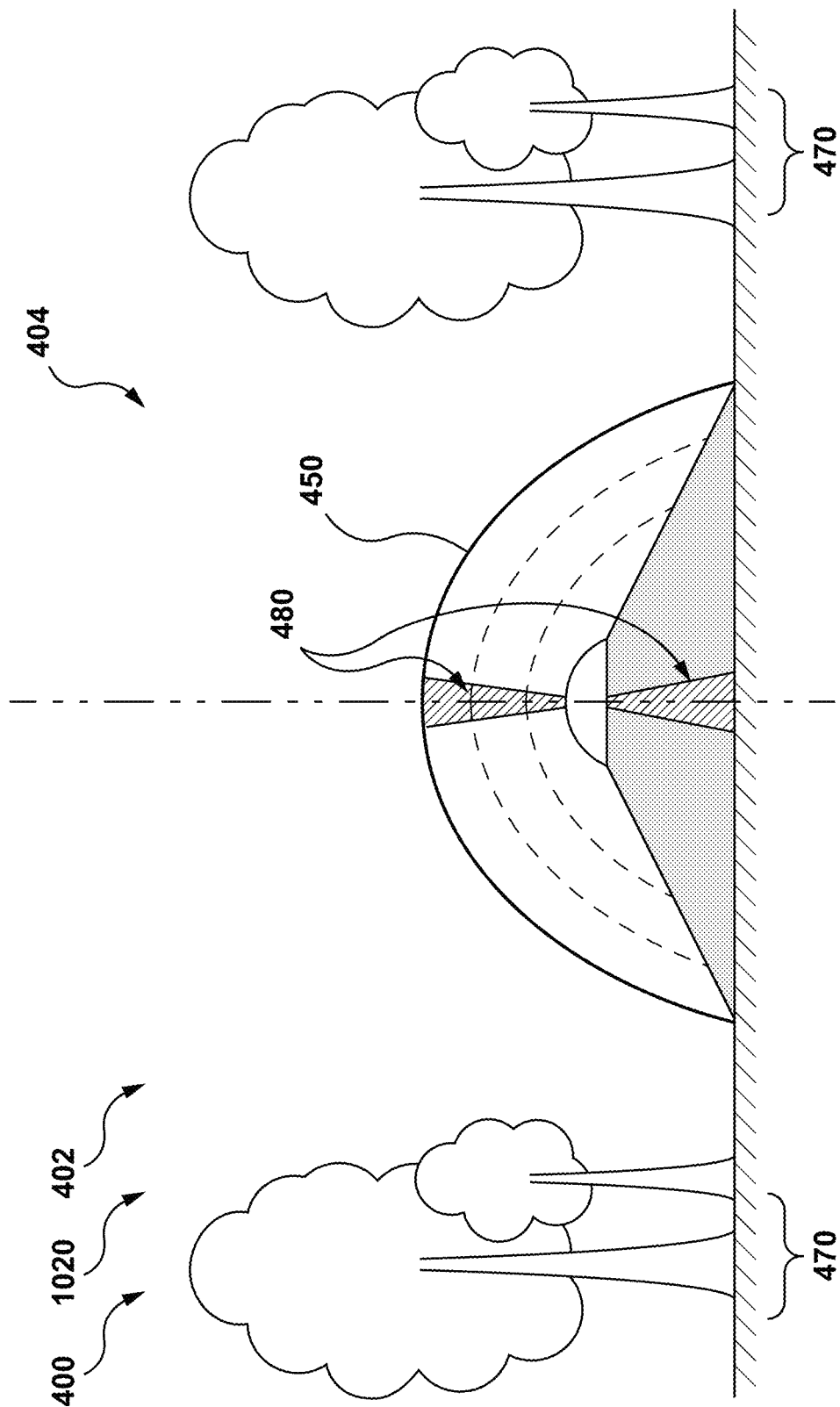
FIG. 11 schematically depicts a merged representation of the scene of FIG. 4 generated by the processor of the networked computing environment of FIG. 2, in accordance with the non-limiting embodiments of the present technology.
Figure 12:
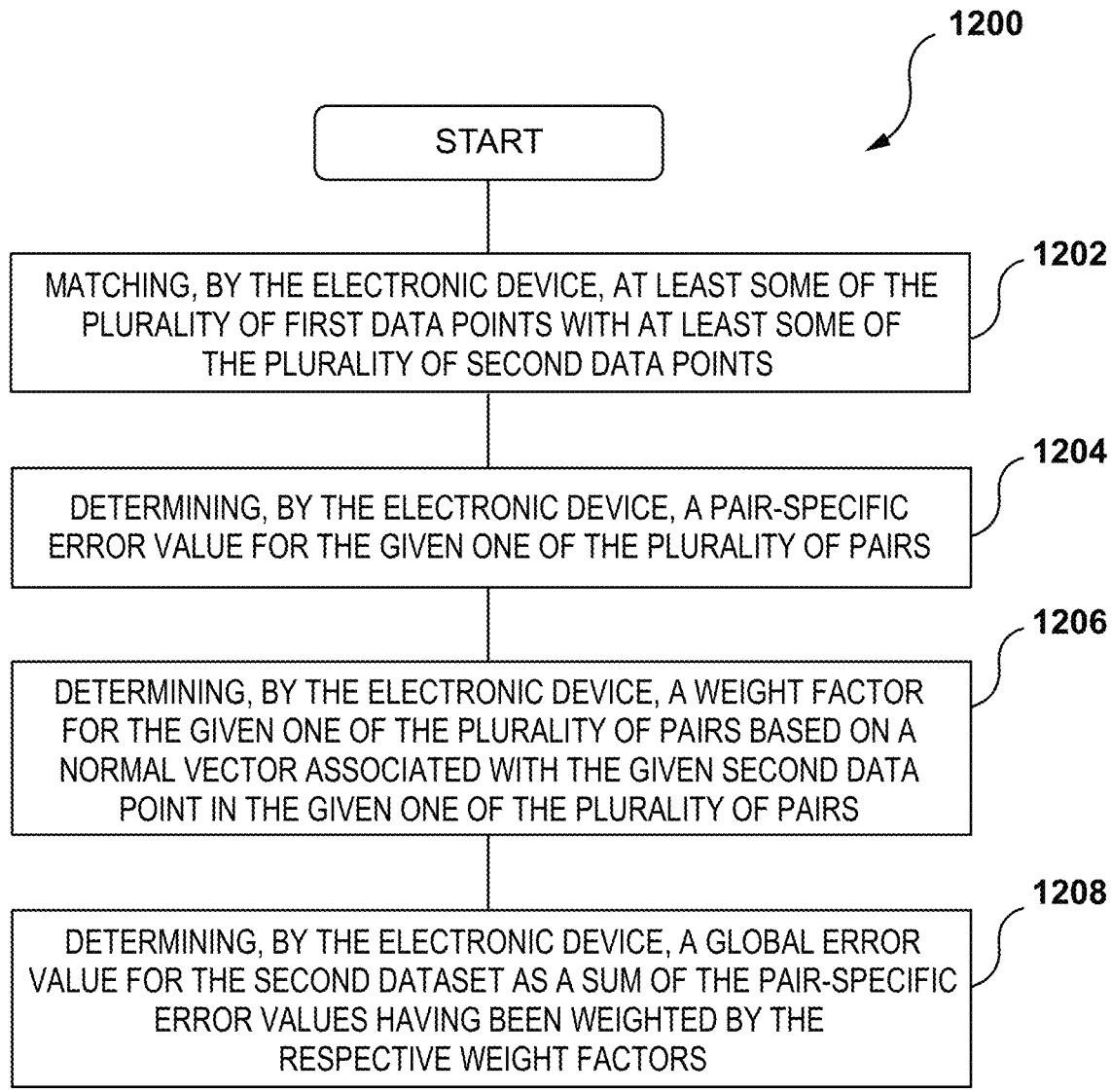
FIG. 12 depicts a flow chart of a method for merging, by the processor of the electronic device of the networked computing environment of FIG. 2, the two 3D point clouds of FIG. 4 independently generated by the sensors of the vehicle present in the network computing environment of FIG. 2 for providing the merged representation of FIG. 11, in accordance with the non-limiting embodiments of the present technology.

Thus, iteratively executing the ICP algorithm according to the stages, described above with respect to FIGS. 5 to 10, and minimizing one of the error metrics up to the predetermined error threshold value, the processor 110 is configured to generate the merged 3D representation 1020 of the given scene 400 depicted in FIG. 11.

As it can be appreciated from FIG. 11, in the merged 3D representation 1020 of the given scene 400, both the first portion 402 and the second portion 404 thereof are aligned with each other and respective ones of the plurality of overlapping regions 480 are substantially merged with each other. Accordingly, the given object 450 now has a more integral visual representation than that provided by the 3D representation 420 depicted in FIG. 4.

It is to be expressly understood that, according to the non-limiting embodiments of the present technology, certain stages of the ICP algorithm as described in respect of Scenario 1 may be used for implementing Scenario 2, and vice versa.

Given the architecture and the examples provided hereinabove, it is possible to execute a method for merging a source plurality of LIDAR points (for example, the second plurality of LIDAR points 560) with a target plurality LIDAR points (for example, the first plurality of LIDAR points 540) in a single multidimensional space (for example, the multidimensional space 502), according to the non-limiting embodiments of the present technology. The first plurality of LIDAR points 540 and the second plurality of LIDAR points 560 are representative of respective portions of the 3D representation 420 of the given scene 400. The method 1200 is executable by the processor 110. The processor 110 may, for example, be part of the electronic device 210. The processor 110 is configured to execute the ICP algorithm.

In the non-limiting, the processor 110 may be configured to pre-calculate, in the multidimensional space 502, for each of the first plurality of LIDAR points 540 and the second plurality of LIDAR points 560, respectively, the first plurality of normal vectors 550 and the second plurality of normal vectors 570, as described above with respect to FIG. 5.

Step 1202—Matching, by the Electronic Device, at Least Some of the Plurality of First Data Points with at Least Some of the Plurality of Second Data Points At step 1202, the processor 110 is first configured to match each of the second plurality of LIDAR points 560 with a respective one of the first plurality of LIDAR points 540, thereby forming a plurality of LIDAR point pairs as described above with reference to FIGS. 8 and 9.

In some non-limiting embodiments of the present technology, prior to forming the plurality of LIDAR point pairs, the processor 110 is configured to have selected at least some from the first plurality of LIDAR points 540 and at least some of the second plurality of LIDAR points 560.

In some non-limiting embodiments of the present technology, the processor 110 is configured to use for matching the first plurality of LIDAR points 540 and the second plurality of LIDAR points in their entirety, i.e. without selection LIDAR points therefrom.

In other non-limiting embodiments of the present technology, for selecting LIDAR points, the processor 110 is configured to apply, to at least one of the first plurality of LIDAR points 540 and the second plurality of LIDAR points 560, one of a uniform sampling algorithm, a random sampling algorithm, and a normal-vector-distribution algorithm, as described above in the LIDAR Point Selection section.

The method 1200 further advances to step 1204.

Step 1204—Determining, by the Electronic Device, a Pair-Specific Error Value for the Given One of the Plurality of Pairs At step 1204, the processor 110 is configured to determine, for a given one of the plurality of LIDAR point pairs, a pair-specific error value indicative of a distance metric between corresponding LIDAR points in the given LIDAR point pair in the multidimensional space 502.

According to some non-limiting embodiments of the present technology, a given pair-specific error value associated with a given LIDAR point pair is based on a closest distance between corresponding ones of the second plurality of LIDAR points 560 and the first plurality of LIDAR points 540 forming the given LIDAR point pair.

In other non-limiting embodiments of the present technology, the given pair-specific error value is based on a distance between the corresponding one of the second plurality of LIDAR points 560 and a plane defined by a normal vector at the corresponding one of the first plurality of LIDAR points 540 in the given LIDAR point pair.

In some non-limiting embodiments of the present technology, the processor 110 is configured, based on the given pair-specific error value, reject outliers, as described in the Rejecting Outliers section.

After determining respective pair-specific error values, the method 1200 further proceeds to step 1206.

Step 1206—Determining, by the Electronic Device, a Weight Factor for the Given One of the Plurality of Pairs Based on a Normal Vector Associated with the Given Second Data Point in the Given One of the Plurality of Pairs At step 1206, the processor 110 is configured, for each of the plurality of LIDAR pairs, determine and assign thereto a respective value of a predetermined weight factor.

In some non-limiting embodiments of the present technology, the predetermined weight factor is the weight factor $\varphi$ defined above by Equation 1. Specifically, a given value of the weight factor $\varphi$ determined for a given LIDAR pair is indicative of how popular a normal vector, at the corresponding one of the second plurality of LIDAR points 560 on the given LIDAR point pair, in the distribution of the second plurality of normal vectors 570. In other words, the given value of the weight factor $\varphi$ is inversely proportional to a density of occurrence of normal vectors in the second plurality of normal vectors 570 having a same angular orientation as the normal vector associated with the corresponding one of the second plurality of LIDAR points 560 in the given LIDAR point pair.

According to some non-limiting embodiments of the present technology, the processor 110 is configured to determine the given value of the weight factor $\varphi$ using a spherical representation of the second plurality of LIDAR points 560 and, associated therewith, the second plurality of normal vectors 570, as described above with reference to FIG. 6.

In other non-limiting embodiments of the present technology, the processor 110 is configured to determine the given value of the weight factor $\varphi$ using a polyhedral approximation for the spherical representation of FIG. 6, as described above with reference to FIG. 7.

In yet other non-limiting embodiments of the present technology, the processor 110 is configured to use a normal distribution with pre-determined parameters to approximate an actual distribution of the second plurality of LIDAR points 560 (and the second plurality of normal vectors 570 associated therewith). In other words, the approximation attempts to determine the parameter $\rho(n_i)$ for the corresponding one of the second plurality of LIDAR points 560 in the given LIDAR point pair, and based thereon, determine the given value of the weight factor $\varphi$.

In the non-limiting embodiments of the present technology, the processor 110 is configured to determine a maximal and minimal value for the weight factor $\varphi$, thereby generating an associated range. Further, the processor 110 is configured to adjust each value of the weight factor $\varphi$ beyond the associated range to a closest one of the maximal value and the minimal value. Thus, the processor 110 is configured to determine adjusted values of the weight factor $\omega$.

The method 1200 further advances to step 1208.

Step 1208—Determining, by the Electronic Device, a Global Error Value for the Second Dataset as a Sum of the Pair-Specific Error Values Having been Weighted by the Respective Weight Factors At step 1208, the processor 110 is configured to weight, based on the weight factor $\omega$, each of the determined pair-specific error values and calculating a sum thereof, thereby determining a value of a global error value. Analytically, the global error value is a value of a respective one of the point-to-point error metric and point-to-plane error metric described above in the Assigning an Error Metric and Applying a Transformation section and defined by Equation (2) and (3), respectively. To that end, the processor 110 is configured to minimize the global error value by applying one of translation and rotation transformation rules corresponding to respective rigid transformations of the second plurality of LIDAR points 560 relative to the first plurality of LIDAR points 540 in the multidimensional space 502. Thus, the processor 110 is configured to displace, by applying one of the transformation rules, the second plurality of LIDAR points 560 relative to the first plurality of LIDAR points 540 in the multidimensional space 502.

In the non-limiting embodiments of the present technology, iteratively applying the above steps to the LIDAR points of the first plurality of LIDAR points 540 and the second plurality of LIDAR points to minimize the global error value, the processor 110 causes the second plurality of LIDAR points 560 to go through a plurality of intermediate positions until reaching a predetermined stopping condition corresponding to a final position of the second plurality of LIDAR points 560 relative to the first plurality of LIDAR points 540 in the multidimensional space 502.

In the non-limiting embodiments of the present technology, the predetermined stopping condition is determined to be reached when the global error value is equal to or lower than a predetermined error threshold value associated with the respective error metric.

Thus, in the non-limiting embodiments of the present technology, the final position of the second plurality of LIDAR points 560 is a position of the second plurality of LIDAR points 560 in the multidimensional space 502, whereat it is substantially merged with the first plurality of LIDAR points 540.

By so doing, the processor 110 is configured to generate the merged 3D representation 1020 of the given scene 400. Accordingly, in the merged 3D representation 1020 of the given scene 400, objects are better aligned relative to each other (for example, objects of the other objects 470) and have a more visually integral representation (as the given object 450) compared to the 3D representation 420.

The method 1200 hence terminates.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of merging digital datasets in a multidimensional space executed by a processor of an electronic device executing instructions stored on a non-transitory computer-readable medium;
   the non-transitory computer-readable medium storing the digital datasets comprising:
   (i) a first dataset having a plurality of first data points, and
   (ii) a second dataset having a plurality of second data points and a plurality of normal vectors, wherein the first and second data points are LIDAR data points and wherein each normal vector of the plurality of normal vectors has been calculated based on a neighborhood of LIDAR data points for an associated second data point;

each second data point from the plurality of second data points being associated with a respective normal vector from the plurality of normal vectors, the computer-implemented method executed by the processor of the electronic device and executing at least an Iterative Closest Point (ICP) algorithm, the computer-implemented method comprising:

matching at least some of the plurality of first data points with at least some of the plurality of second data points, thereby determining a plurality of pairs, a given one of the plurality of pairs including (i) a given first data point and (ii) a given second data point;

determining a pair-specific error value for the given one of the plurality of pairs, the pair-specific error value being indicative of a distance measurement for the given one of the plurality of pairs in the multidimensional space;

determining a weight factor for the given one of the plurality of pairs based on a normal vector associated with the given second data point in the given one of the plurality of pairs, such that the weight factor is inversely proportional to a density of occurrence of the normal vector in a distribution of the plurality of normal vectors; and determining a global error value for the second dataset as a sum of the pair-specific error values having been weighted by the respective weight factors, the global error value being a measurement of a pre-determined error metric that is to be minimized for performing the merging of the digital datasets in the multidimensional space.

2. The computer-implemented method of claim 1, wherein the computer-implemented method further comprises, until a pre-determined stopping condition is reached:

iteratively minimizing the global error value of the second dataset by adjusting an initial position of the second dataset relative to the first dataset in the multidimensional space, thereby iteratively determining intermediary positions of the second dataset relative to the first dataset in the multidimensional space, a latest intermediary position of the second dataset being a final position of the second dataset relative to the first dataset in the multidimensional space.

3. The computer-implemented method of claim 2, wherein the second dataset in the final position is substantially merged with the first dataset.

4. The computer-implemented method of claim 2, wherein the computer-implemented method comprises: determining a transformation rule for the second dataset to be displaced from the initial position to the final position.

5. The computer-implemented method of claim 4, wherein the transformation rule includes a translation rule and a rotation rule.

6. The computer-implemented method of claim 1, wherein the computer-implemented method further comprises, prior to the matching: selecting (i) the at least some of the plurality of first data points from the plurality of first data points and (ii) the at least some of the plurality of second data points from the plurality of second data points.

7. The computer-implemented method of claim 6, wherein the selecting comprises at least one of:

applying a uniform sampling algorithm onto at least one of the plurality of first data points and the plurality of second data points;

applying a random sampling algorithm onto at least one of the plurality of first data points and the plurality of second data points; and applying a normal-vector-distribution algorithm onto at least one of the plurality of first data points and the plurality of second data points.

8. The computer-implemented method of claim 1, wherein the matching comprises: determining for a given one of the at least some of the plurality of second data points a closest first data point from the at least some of the first plurality of data points to the given one of the at least some of the plurality of second data points in the multidimensional space, the given one of the at least some of the plurality of second data points and the closest first data point forming one of the plurality of pairs.

9. The computer-implemented method of claim 1, wherein the error metric is a sum of squared distances between data points in respective ones of the plurality of pairs, the error metric being a point-to-point-type error metric.

10. The computer-implemented method of claim 1, wherein the error metric is a sum of squared distances between a given second data point in a respective one of the plurality of pairs to a plane containing a given first data point in the respective one of the plurality of pairs, the plane being perpendicular to a normal vector associated with the given first data point in the respective one of the plurality of pairs, the error metric being a point-to-plane-type error metric.

11. The computer-implemented method of claim 1, wherein the determining the weight factor comprises:

representing each of the plurality of normal vectors on a sphere of a predetermined dimension;

calculating, for a given one of the plurality of normal vectors, a number of normal vectors located in a predetermined closed neighbourhood on the sphere; the given normal vector being associated with the given second data point in the given one of the plurality of pairs;

determining, for the given one of the plurality of pairs, the weight factor as an inverse value of the number of normal vectors located in the predetermined closed neighbourhood.

12. The computer-implemented method of claim 11, wherein the sphere is approximated with a polyhedron, each vertex of which being located on the sphere, and the plurality of normal vectors being distributed amongst faces of the polyhedron based on proximity to a respective vertex thereof, and the determining the weight factor comprises:

calculating a number of normal vectors located on a given face of the polyhedron, the given face containing the given normal vector associated with the given second data point in the given one of the plurality of pairs;

determining, for the given one of the plurality of pairs, the weight factor as an inverse value of the number of normal vectors located in the given face of the polyhedron.

13. The computer-implemented method of claim 1, wherein the determining the weight factor comprises:

approximating the distribution of the plurality of normal vectors with a normal distribution with predetermined parameters, and predicting, using the Bayesian inference, the density of occurrence of the normal vector in the distribution of the plurality of normal vectors;

determining, for the given one of the plurality of pairs, the weight factor as an inverse value of the density of occurrence of the normal vector in the distribution of the plurality of normal vectors.

14. The computer-implemented method of claim 1, wherein the determining the weight factor comprises determining an adjusted weight factor if the weight factor is outside a pre-determined range, the adjusted weight factor being a closest value to the weight factor inside the pre-determined range.

15. An electronic device comprising:
a processor;
a non-transitory computer-readable medium comprising instructions, the instructions for executing at least an Iterative Closest Point, ICP, algorithm;
the non-transitory computer-readable medium storing at least:
  (i) a first dataset having a plurality of first data points, and
  (ii) a second dataset having a plurality of second data points and a plurality of normal vectors,
    each second data point from the plurality of second data points being associated with a respective normal vector from the plurality of normal vectors, wherein the first and second data points are LIDAR data points and wherein each normal vector of the plurality of normal vectors has been calculated based on a neighborhood of LIDAR data points for the associated second data point;
a communication interface for communicating with a sensor mounted on a vehicle,
the processor, upon executing the instructions, being configured to:
  determine a plurality of pairs of data points based on at least some of the plurality of first data points and at least some of the plurality of second data points,
    a given one of the plurality of pairs including (i) a respective first data point and (ii) a respective second data point;
  determine pair-specific error values for respective ones of the plurality of pairs,
    a given pair-specific error value being indicative of a distance measurement for the respective one of the plurality of pairs in the multidimensional space,
  weight the pair-specific error values by respective weighting factors, thereby determining weighted pair-specific error values,
    a given weighting factor for a respective one of the plurality of pairs being inversely proportional to a density of occurrence of the normal vector of the second data point in the respective one of the plurality of pairs in a distribution of the plurality of normal vectors, and
  determine a global error value for the second dataset as a sum of the weighted pair-specific error values,
    the global error value being a measurement of a pre-determined error metric that is to be minimized during the execution of the ICP algorithm.

16. The electronic device of claim 15, wherein the processor, upon executing the instructions, is configured to, until a pre-determined stopping condition is reached, iteratively minimize the global error value of the second dataset by adjusting an initial position of the second dataset relative to the first dataset in the multidimensional space, thereby iteratively determining intermediary positions of the second dataset relative to the first dataset in the multidimensional space, a latest intermediary position of the second dataset being a final position of the second dataset relative to the first dataset in the multidimensional space.

17. The electronic device of claim 16, wherein the second dataset in the final position is substantially merged with the first dataset.

18. The electronic device of claim 16, wherein the processor, upon executing the instructions, is configured to determine a transformation rule for the second dataset to be displaced from the initial position to the final position.

19. The electronic device of claim 18, wherein the transformation rule includes a translation rule and a rotation rule.

20. The electronic device of claim 15, wherein the pre-determined error metric is a sum of squared distances between data points in respective ones of the plurality of pairs.

* * * * *